US011443481B1

(12) United States Patent
Yin et al.

(10) Patent No.: US 11,443,481 B1
(45) Date of Patent: Sep. 13, 2022

(54) RECONSTRUCTING THREE-DIMENSIONAL SCENES PORTRAYED IN DIGITAL IMAGES UTILIZING POINT CLOUD MACHINE-LEARNING MODELS

(71) Applicant: Adobe Inc., San Jose, CA (US)

(72) Inventors: Wei Yin, Adelaide (AU); Jianming Zhang, Campbell, CA (US); Oliver Wang, Seattle, WA (US); Simon Niklaus, San Jose, CA (US); Mai Long, Portland, OR (US); Su Chen, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/186,522

(22) Filed: Feb. 26, 2021

(51) Int. Cl.
| | | |
|---|---|---|
| G06T 17/00 | (2006.01) | |
| G06T 7/80 | (2017.01) | |
| G06N 3/04 | (2006.01) | |
| G06V 20/00 | (2022.01) | |

(52) U.S. Cl.
CPC ............ *G06T 17/00* (2013.01); *G06N 3/04* (2013.01); *G06T 7/80* (2017.01); *G06V 20/00* (2022.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 10,671,082 | B2* | 6/2020 | Huang | .................. G06T 3/4046 |
| 2006/0232498 | A1* | 10/2006 | Seo | ..................... G02B 26/0833 |
| | | | | 345/6 |
| 2018/0213208 | A1* | 7/2018 | Guo | ..................... H04N 13/296 |
| 2021/0343081 | A1* | 11/2021 | Mermerkaya | ........ H04N 13/243 |
| 2021/0352261 | A1* | 11/2021 | Watson | .................. A63F 13/65 |

OTHER PUBLICATIONS

Iro Armeni, Sasha Sax, Amir R Zamir, and Silvio Savarese. Joint 2d-3d-semantic data for indoor scene understanding. arXiv preprint arXiv:1702.01105, 2017.
Jonathan T Barron and Jitendra Malik. Shape, illumination, and reflectance from shading. IEEE Trans. Pattern Anal. Mach. Intell., 37(8):1670-1687, 2014.

(Continued)

*Primary Examiner* — Saptarshi Mazumder
(74) *Attorney, Agent, or Firm* — Keller Preece PLLC

(57) ABSTRACT

This disclosure describes implementations of a three-dimensional (3D) scene recovery system that reconstructs a 3D scene representation of a scene portrayed in a single digital image. For instance, the 3D scene recovery system trains and utilizes a 3D point cloud model to recover accurate intrinsic camera parameters from a depth map of the digital image. Additionally, the 3D point cloud model may include multiple neural networks that target specific intrinsic camera parameters. For example, the 3D point cloud model may include a depth 3D point cloud neural network that recovers the depth shift as well as include a focal length 3D point cloud neural network that recovers the camera focal length. Further, the 3D scene recovery system may utilize the recovered intrinsic camera parameters to transform the single digital image into an accurate and realistic 3D scene representation, such as a 3D point cloud.

20 Claims, 13 Drawing Sheets

(56) References Cited

OTHER PUBLICATIONS

Jiawang Bian, Zhichao Li, Naiyan Wang, Huangying Zhan, Chunhua Shen, Ming-Ming Cheng, and Ian Reid. Unsupervised scale-consistent depth and ego-motion learning from monocular video. In Proc. Advances in Neural Inf. Process. Syst., pp. 35-45, 2019.
D. J. Butler, J. Wulff, G. B. Stanley, and M. J. Black. A naturalistic open source movie for optical flow evaluation. In Proc. Eur. Conf. Comp. Vis., pp. 611-625. Springer, 2012.
Liang-Chieh Chen, Yukun Zhu, George Papandreou, Florian Schroff, and Hartwig Adam. Encoder-decoder with atrous separable convolution for semantic image segmentation. In Proc. Eur. Conf. Comp. Vis., 2018.
Weifeng Chen, Zhao Fu, Dawei Yang, and Jia Deng. Single-image depth perception in the wild. In Proc. Advances in Neural Inf. Process. Syst., pp. 730-738, 2016.
Weifeng Chen, Shengyi Qian, and Jia Deng. Learning single-image depth from videos using quality assessment networks. In Proc. IEEE Conf. Comp. Vis. Patt. Recogn., pp. 5604-5613, 2019.
Weifeng Chen, Shengyi Qian, David Fan, Noriyuki Kojima, Max Hamilton, and Jia Deng. Oasis: A large-scale dataset for single image 3d in the wild. In Proc. IEEE Conf. Comp. Vis. Patt. Recogn., pp. 679-688, 2020.
Angela Dai, Angel X Chang, Manolis Savva, Maciej Halber, Thomas Funkhouser, and Matthias Nießner. Scannet: Richly-annotated 3d reconstructions of indoor scenes. In Proc. IEEE Conf. Comp. Vis. Patt. Recogn., pp. 5828-5839, 2017.
Jonathan Deutscher, Michael Isard, and John MacCormick. Automatic camera calibration from a single manhattan image. In Proc. Eur. Conf. Comp. Vis., pp. 175-188. Springer, 2002.
David Eigen, Christian Puhrsch, and Rob Fergus. Depth map prediction from a single image using a multi-scale deep network. In Proc. Advances in Neural Inf. Process. Syst., pp. 2366-2374, 2014.
Jose M Facil, Benjamin Ummenhofer, Huizhong Zhou, Luis Montesano, Thomas Brox, and Javier Civera. Camconvs: camera-aware multi-scale convolutions for single-view depth. In Proc. IEEE Conf. Comp. Vis. Patt. Recogn., pp. 11826-11835, 2019.
Keinosuke Fukunaga. Introduction to Statistical Pattern Recognition. Elsevier, 2013 part 1.
Keinosuke Fukunaga. Introduction to Statistical Pattern Recognition. Elsevier, 2013 part 2.
Keinosuke Fukunaga. Introduction to Statistical Pattern Recognition. Elsevier, 2013 part 3.
Keinosuke Fukunaga. Introduction to Statistical Pattern Recognition. Elsevier, 2013 part 4.
Salvador Garcia, Julian Luengo, and Francisco Herrera. Data preprocessing in data mining. Springer, 2015.
Andreas Geiger, Philip Lenz, and Raquel Urtasun. Are we ready for autonomous driving? the kitti vision benchmark suite. In Proc. IEEE Conf. Comp. Vis. Patt. Recogn., pp. 3354-3361. IEEE, 2012.
Clement Godard, Oisin Mac Aodha, Michael Firman, and Gabriel J. Brostow. Digging into self-supervised monocular depth prediction. In Proc. IEEE Int. Conf. Comp. Vis., 2019.
Richard Hartley and Andrew Zisserman. Multiple view geometry in computer vision. Cambridge university press, 2003.
Kaiming He, Xiangyu Zhang, Shaoqing Ren, and Jian Sun. Deep residual learning for image recognition. In Proc. IEEE Conf. Comp. Vis. Patt. Recogn., pp. 770-778, 2016.
Yannick Hold-Geoffroy, Kalyan Sunkavalli, Jonathan Eisenmann, Matthew Fisher, Emiliano Gambaretto, Sunil Hadap, and Jean-Francois Lalonde. A perceptual measure for deep single image camera calibration. In Proc. IEEE Conf. Comp. Vis. Patt. Recogn., pp. 2354-2363, 2018.
Yiwen Hua, Puneet Kohli, Pritish Uplavikar, Anand Ravi, Saravana Gunaseelan, Jason Orozco, and Edward Li. Holopix50k: A large-scale in-the-wild stereo image dataset. In IEEE Conf. Comput. Vis. Pattern Recog. Worksh., Jun. 2020.

E. Ilg, N. Mayer, T. Saikia, M. Keuper, A. Dosovitskiy, and T. Brox. Flownet 2.0: Evolution of optical flow estimation with deep networks. In Proc. IEEE Conf. Comp. Vis. Patt. Recogn., 2017.
Olga A Karpenko and John Hughes. Smoothsketch: 3d free-form shapes from complex sketches. In ACM. T. Graph. (SIGGRAPH), pp. 589-598. 2006.
Youngjung Kim, Hyungjoo Jung, Dongbo Min, and Kwanghoon Sohn. Deep monocular depth estimation via integration of global and local predictions. IEEE Trans. Image Process., 27(8):4131-4144, 2018.
Tobias Koch, Lukas Liebel, Friedrich Fraundorfer, and MarcoKörner. Evaluation of CNN-based single-image depth estimation methods. In Eur. Conf. Comput. Vis. Worksh., pp. 331-348, 2018.
Manuel Lang, Alexander Hornung, Oliver Wang, Steven Poulakos, Aljoscha Smolic, and Markus Gross. Nonlinear disparity mapping for stereoscopic 3d. ACM Trans. Graph., 29(4):1-10, 2010.
Zhengqi Li and Noah Snavely. Megadepth: Learning single-view depth prediction from internet photos. In Proc. IEEE Conf. Comp. Vis. Patt. Recogn., pp. 2041-2050, 2018.
Fayao Liu, Chunhua Shen, Guosheng Lin, and Ian Reid. Learning depth from single monocular images using deep convolutional neural fields. IEEE Trans. Pattern Anal. Mach. Intell., 38(10):2024-2039, 2015.
Yifan Liu, Bohan Zhuang, Chunhua Shen, Hao Chen, and Wei Yin. Training compact neural networks via auxiliary overparameterization. arXiv preprint arXiv:1909.02214, 2019.
Zhijian Liu, Haotian Tang, Yujun Lin, and Song Han. Point-voxel cnn for efficient 3d deep learning. In Proc. Advances in Neural Inf. Process. Syst., 2019.
Simon Niklaus, Long Mai, Jimei Yang, and Feng Liu. 3d ken burns effect from a single image. ACM Trans. Graph., 38(6):184:1-184:15, 2019.
Emmanuel Prados and Olivier Faugeras. Shape from shading: a well-posed problem? In Proc. IEEE Conf. Comp. Vis. Patt. Recogn., vol. 2, pp. 870-877. IEEE, 2005.
Rene Ranftl, Katrin Lasinger, David Hafner, Konrad Schindler, and Vladlen Koltun. Towards robust monocular depth estimation: Mixing datasets for zero-shot cross-dataset transfer. IEEE Trans. Pattern Anal. Mach. Intell., 2020.
Shunsuke Saito, Zeng Huang, Ryota Natsume, Shigeo Morishima, Angjoo Kanazawa, and Hao Li. Pifu: Pixel-aligned implicit function for high-resolution clothed human digitization. In Proc. IEEE Conf. Comp. Vis. Patt. Recogn., pp. 2304-2314, 2019.
Shunsuke Saito, Tomas Simon, Jason Saragih, and Hanbyul Joo. Pifuhd: Multi-level pixel-aligned implicit function for high-resolution 3d human digitization. In Proc. IEEE Conf. Comp. Vis. Patt. Recogn., pp. 84-93, 2020.
Ashutosh Saxena, Min Sun, and Andrew Y Ng. Make3d: Learning 3d scene structure from a single still image. IEEE Trans. Pattern Anal. Mach. Intell., 31(5):824-840, 2008.
Thomas Schops, Johannes L Schonberger, Silvano Galliani, Torsten Sattler, Konrad Schindler, Marc Pollefeys, and An-dreas Geiger. A multi-view stereo benchmark with high-resolution images and multi-camera videos. In Proc. IEEE Conf. Comp. Vis. Patt. Recogn., pp. 3260-3269, 2017.
Nathan Silberman, Derek Hoiem, Pushmeet Kohli, and Rob Fergus. Indoor segmentation and support inference from rgbd images. In Proc. Eur. Conf. Comp. Vis., pp. 746-760. Springer, 2012.
Dalwinder Singh and Birmohan Singh. Investigating the impact of data normalization on classification performance. Ap-plied Soft Computing, p. 105524, 2019.
Igor Vasiljevic, Nick Kolkin, Shanyi Zhang, Ruotian Luo, Haochen Wang, Falcon Z Dai, Andrea F Daniele, Mohammadreza Mostajabi, Steven Basart, Matthew R Walter, et al. Diode: A dense indoor and outdoor depth dataset. arXiv preprint arXiv:1908.00463, 2019.
Chaoyang Wang, Simon Lucey, Federico Perazzi, and Oliver Wang. Web stereo video supervision for depth prediction from dynamic scenes. In Int. Conf. 3D. Vis., pp. 348-357. IEEE, 2019.
Lijun Wang, Jianming Zhang, Oliver Wang, Zhe Lin, and Huchuan Lu. Sdc-depth: Semantic divide-and-conquer network for monocular depth estimation. In Proc. IEEE Conf. Comp. Vis. Patt. Recogn., pp. 541-550, 2020.

(56) References Cited

OTHER PUBLICATIONS

Nanyang Wang, Yinda Zhang, Zhuwen Li, Yanwei Fu, Wei Liu, and Yu-Gang Jiang. Pixel2mesh: Generating 3d mesh models from single RGB images. In Proc. Eur. Conf. Comp. Vis., pp. 52-67, 2018.

Xinlong Wang, Wei Yin, Tao Kong, Yuning Jiang, Lei Li, and Chunhua Shen. Task-aware monocular depth estimation for 3d object detection. In Proc. AAAI Conf. Artificial Intell., 2020.

Scott Workman, Connor Greenwell, Menghua Zhai, Ryan Baltenberger, and Nathan Jacobs. Deepfocal: A method for direct focal length estimation. In Proc. IEEE Int. Conf. Image Process., pp. 1369-1373. IEEE, 2015.

Jiajun Wu, Chengkai Zhang, Xiuming Zhang, Zhoutong Zhang, William Freeman, and Joshua Tenenbaum. Learning shape priors for single-view 3d completion and reconstruction. In Proc. Eur. Conf. Comp. Vis., pp. 646-662, 2018.

Ke Xian, Chunhua Shen, Zhiguo Cao, Hao Lu, Yang Xiao, Ruibo Li, and Zhenbo Luo. Monocular relative depth perception with web stereo data supervision. In Proc. IEEE Conf. Comp. Vis. Patt. Recogn., pp. 311-320, 2018.

Ke Xian, Jianming Zhang, Oliver Wang, Long Mai, Zhe Lin, and Zhiguo Cao. Structure-guided ranking loss for single image depth prediction. In Proc. IEEE Conf. Comp. Vis. Patt. Recogn., pp. 611-620, 2020.

Jianxiong Xiao, Krista A Ehinger, Aude Oliva, and Antonio Torralba. Recognizing scene viewpoint using panoramic place representation. In Proc. IEEE Conf. Comp. Vis. Patt. Recogn., pp. 2695-2702. IEEE, 2012.

Saining Xie, Ross Girshick, Piotr Dollar, Zhuowen Tu, and Kaiming He. Aggregated residual transformations for deep neural networks. In Proc. IEEE Conf. Comp. Vis. Patt. Recogn., pp. 1492-1500, 2017.

Wei Yin, Yifan Liu, Chunhua Shen, and Youliang Yan. Enforcing geometric constraints of virtual normal for depth prediction. In Proc. IEEE Int. Conf. Comp. Vis., 2019.

Wei Yin, Xinlong Wang, Chunhua Shen, Yifan Liu, Zhi Tian, Songcen Xu, Changming Sun, and Dou Renyin. Diversedepth: Affine-invariant depth prediction using diverse data. arXiv preprint arXiv:2002.00569, 2020.

Amir Zamir, Alexander Sax, , William Shen, Leonidas Guibas, Jitendra Malik, and Silvio Savarese. Taskonomy: Disentangling task transfer learning. In Proc. IEEE Conf. Comp. Vis. Patt. Recogn. IEEE, 2018.

Feihu Zhang, Victor Prisacariu, Ruigang Yang, and Philip Torr. Ga-net: Guided aggregation net for end-to-end stereo matching. In Proc. IEEE Conf. Comp. Vis. Patt. Recogn., pp. 185-194, 2019.

Zhengyou Zhang. A flexible new technique for camera calibration. IEEE Trans. Pattern Anal. Mach. Intell., 22(11):1330-1334, 2000.

\* cited by examiner

RECONSTRUCTING THREE-DIMENSIONAL SCENES PORTRAYED IN DIGITAL IMAGES UTILIZING POINT CLOUD MACHINE-LEARNING MODELS

BACKGROUND

Recent years have seen significant improvements in hardware and software platforms for training and utilizing machine-learning models. For instance, many machine-learning methods have achieved promising performance in areas such as digital image 3D shape reconstruction. Notwithstanding these improvements, conventional systems continue to suffer from several problems with regard to the accuracy, efficiency, and flexibility of computing device operations, and in particular, with respect to generating accurate and realistic three-dimensional (3D) representations of scenes portrayed in single digital images. For example, most conventional systems require multiple digital images of the same scene from different viewpoints to reconstruct the scene as a 3D image. Indeed, conventional systems that attempt to create a 3D image from a single digital image suffer from noticeable inaccuracies such as shape distortions and improper scene scaling. These along with additional problems and issues exist in current systems for monocular depth estimation and generating 3D scene shape.

BRIEF SUMMARY

Implementations of the present disclosure provide benefits and/or solve one or more of the foregoing or other problems in the art with systems, non-transitory computer-readable media, and methods that accurately, flexibly, and efficiently generate and reconstruct three-dimensional (3D) scenes from a single input digital image utilizing a 3D point cloud model. In particular, in one or more embodiments the disclosed systems utilize a two-stage framework that first predicts depth up to an unknown scale and shift from a single monocular image and then uses 3D point cloud encoders to predict the missing depth shift and focal length for recovering a realistic 3D scene shape. To illustrate, the disclosed systems utilize a depth prediction machine-learning model to generate a depth map for a single input digital image that portrays a 3D scene. In one or more embodiments, the disclosed systems then utilize a 3D point cloud model to process the depth map together with an initial estimate of intrinsic camera parameters (such as camera focal length) to generate an initial 3D representation of the scene. For instance, in one or more implementations, the disclosed systems utilize a 3D point cloud model that includes multiple 3D point cloud neural networks, each trained utilizing a ground truth distortion recovery approach, to determine different intrinsic camera parameter adjustment factors that refine the initial 3D representation of the scene to an accurate 3D scene representation.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
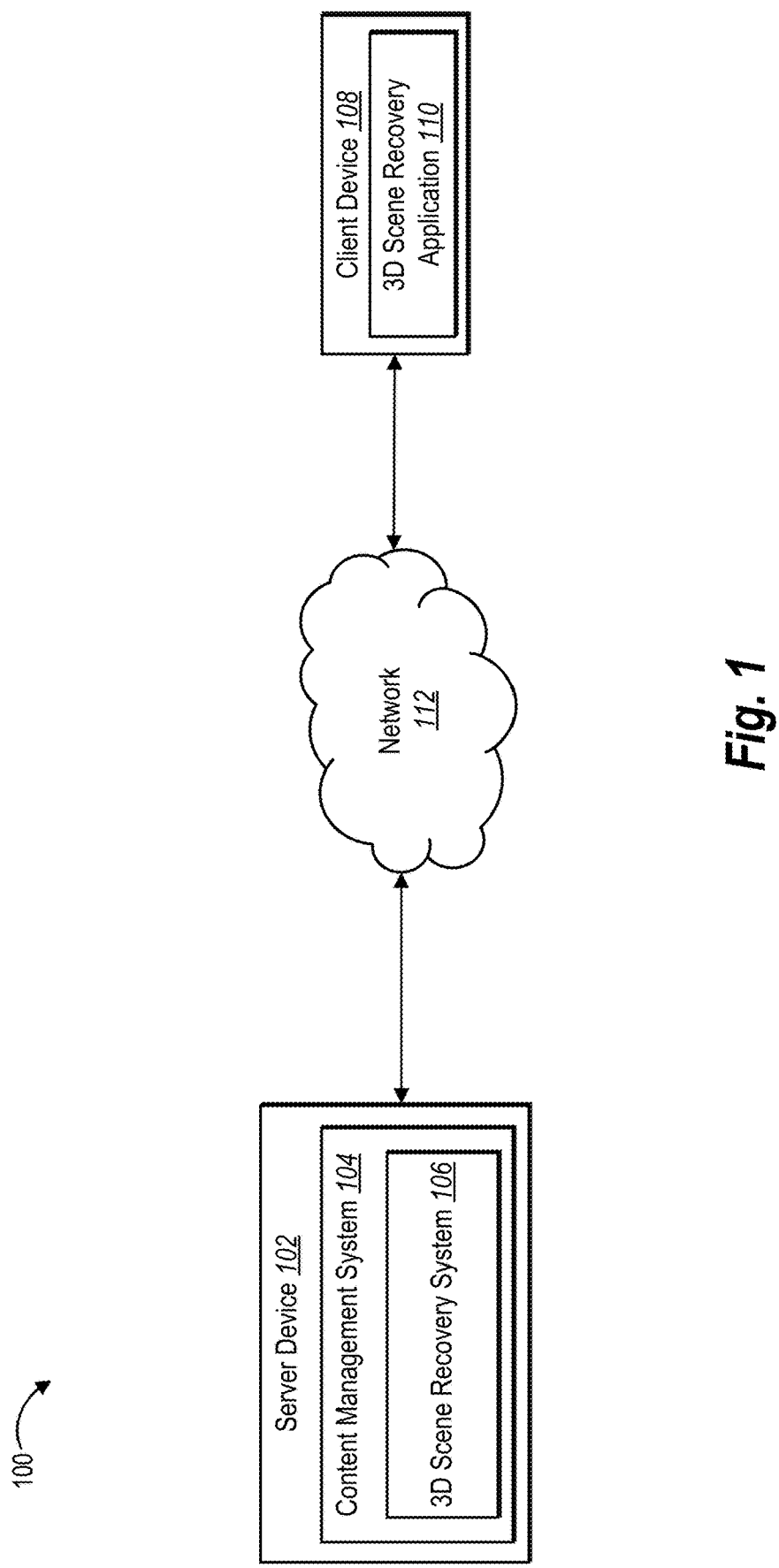
FIG. 1 illustrates a schematic diagram of a system environment in which a 3D scene recovery system operates in accordance with one or more implementations.

This disclosure describes one or more implementations of a three-dimensional (3D) scene recovery system that generates a 3D representation of a scene portrayed in a digital image. In particular, in one or more embodiments the 3D scene recovery system utilizes a two-stage approach that generates a depth map from a single input image and then uses a 3D point cloud model to determine intrinsic camera parameters for constructing a realistic 3D scene representation. For example, in one or more implementations, the 3D scene recovery system generates a depth map from the input digital image utilizing a depth prediction model. Moreover, the 3D scene recovery system constructs an estimated 3D point cloud from the depth map and one or more estimated intrinsic camera parameters (such as an estimated focal length). In addition, in various implementations, the 3D scene recovery system trains and utilizes a 3D point cloud model to recover accurate intrinsic camera parameters based on the estimated 3D point cloud. The 3D point cloud model can also include multiple neural networks that target specific intrinsic camera parameters. For instance, in one or more implementations, the 3D point cloud model includes a depth 3D point cloud neural network that recovers the depth shift as well as includes a focal length 3D point cloud neural network that recovers the camera focal length. In one or more embodiments, the 3D scene recovery system utilizes the recovered intrinsic camera parameters to transform the digital image into an accurate and realistic 3D scene representation.

As mentioned above, in various implementations, the 3D scene recovery system trains the 3D point cloud model to recover intrinsic camera parameters for an input digital image. For instance, in one or more implementations, the 3D scene recovery system distorts intrinsic camera parameters (such as depth shift, camera focal length, and/or camera lens distortion) each by an intrinsic camera parameter adjustment factor. For example, the 3D scene recovery system distorts a ground truth focal length by a ground truth focal length adjustment factor. Further, in some implementations, the 3D scene recovery system constructs a distorted 3D point cloud from the distorted intrinsic camera parameter ground truths.

Additionally, in one or more implementations, the 3D scene recovery system utilizes the 3D point cloud model to recover intrinsic camera parameters from the distorted 3D point cloud. For example, the 3D point cloud model includes a depth 3D point cloud neural network that generates a depth adjustment factor and includes a predicted focal length 3D point cloud neural network that generates a predicted focal length adjustment factor. The 3D scene recovery system then compares the predicted focal length adjustment factor with the ground truth focal length adjustment factor to determine a focal length loss that is used to tune the focal length 3D point cloud neural network. In a similar manner, the 3D scene recovery system can train the depth 3D point cloud neural network and/or other intrinsic camera parameter 3D point cloud neural networks.

Upon training the 3D point cloud neural network(s), the 3D scene recovery system can utilize the 3D point cloud model in conjunction with a depth prediction model to recover intrinsic camera parameters from input digital images. As mentioned above, when an input digital image is received, the 3D scene recovery system may generate a depth map from the input digital image utilizing a depth prediction model. Moreover, the 3D scene recovery system can estimate an initial depth shift and scale from the input digital image.

In various implementations, the 3D scene recovery system utilizes focal length, along with the depth shift, to accurately construct a 3D scene representation from a digital image. Accordingly, in various implementations, the 3D scene recovery system estimates an initial focal length for the input digital image. The 3D scene recovery system can then generate an estimated 3D point cloud from the depth map and the initial focal length. In some implementations, the 3D scene recovery system also estimates and utilizes other initial intrinsic camera parameters for the input digital image.

In various implementations, the 3D scene recovery system utilizes the trained 3D point cloud model to predict missing intrinsic camera parameters. For example, the 3D scene recovery system utilizes a depth 3D point cloud neural network to determine a depth adjustment factor. In addition, the 3D scene recovery system utilizes a focal length 3D point cloud neural network to determine a focal length adjustment factor. In one or more implementations, the 3D scene recovery system then iteratively refines the depth map and the initial focal length based on the depth adjustment factor and focal length adjustment factor.

As mentioned above, in one or more implementations, the 3D scene recovery system reconstructs a 3D scene representation from the input digital image and intrinsic camera parameters recovered by the 3D point cloud model. In some implementations, the 3D scene recovery system creates the 3D scene representation by unprojecting the input digital image, which utilizes the depth and the focal length to map 2D coordinates of the input digital image to 3D coordinates of a 3D representation of the scene, as further described below.

As mentioned above, conventional systems suffer from a number of problems with regard to the accuracy, efficiency, and flexibility of computing device operations. For example, with respect to accuracy, conventional systems that employ monocular depth estimation methods are unable to recover an accurate 3D point cloud from a single digital image. Instead, conventional systems generate 3D point clouds that include noticeable distortions due to the intrinsic camera parameters of the single digital image being an unknown. To illustrate, conventional systems determine faulty depth shift and camera focal length for single digital images, then use the faulty camera parameters to construct inaccurate, unrealistic, and distorted 3D point clouds. Further, shape distortion increases with uniform scaling when the depth shift is not properly recovered. Indeed, a mismatch between either the depth shift or the focal length will cause image distortion. Thus, not knowing or having the camera focal length during the testing or the reconstruction processes causes conventional systems to construct inaccurate and distorted 3D point clouds.

In addition, conventional systems are often inefficient. Because of the accuracy problems discussed above, many systems either require multiple digital images to construct a three-dimensional representation of a scene (or require time consuming and computationally expensive post-processing interactions to correct inaccuracies). Indeed, conventional systems often require implementing devices to capture and process a digital video or multiple digital images portraying a scene from multiple different perspectives. Capturing and analyzing a variety of different digital images increases storage and computational processing requirements for implementing computing devices.

As mentioned above, many conventional systems are also inflexible. As one example, several conventional systems rigidly require multiple images to reconstruct a 3D point cloud. Indeed, because monocular depth estimation methods have proven inaccurate and faulty in several cases, many conventional systems reconstruct 3D scenes based on feature-point correspondence between consecutive frames or multiple views. However, these conventional systems preclude the possibility of reconstructing 3D scenes based on digital images in-the-wild or other single digital images.

As another example, many conventional systems are limited to poor training data sets. Indeed, several conventional systems are limited by the lack of quality training data. For example, most training data employed by conventional systems can only provide depth supervision up to a limited scale and shift due to the unknown camera baselines. Further, training data often is lacking in quality as the data is captured by different cameras having different image priors (e.g., ground truths) for depth estimation, especially with respect to web stereo images and videos. Moreover, special hardware, which is expensive and not readily available, is often required to capture precise and detailed depth data for an image, which causes many conventional systems to be limited in their capabilities.

Furthermore, conventional systems often train depth recovery models that suffer from overfitting and domain gap problems due to the limited size and narrow scope of the training data. Indeed, the performance of these conventional systems further suffers when faced with input digital images not experienced during training.

The 3D scene recovery system can provide numerous advantages and benefits over conventional systems. As described below, in many implementations, the 3D scene recovery system improves accuracy relative to conventional systems. For instance, the 3D scene recovery system can achieve a dense 3D scene shape reconstruction from a single in-the-wild image utilizing a 3D point cloud model that recovers intrinsic camera parameters for single digital images. For example, in various implementations, the 3D scene recovery system facilitates a monocular 3D scene shape estimation framework that consists of a depth prediction module and a 3D point cloud model (e.g., a 3D point cloud reconstruction model). In these implementations, the 3D point cloud model leverages multiple 3D point cloud encoder networks that predict intrinsic camera parameter adjustment factors from an estimated 3D point cloud reconstruction, then utilizes the intrinsic camera parameter adjustment factors to correct the estimated intrinsic camera parameters.

To illustrate, upon receiving an input digital image lacking shift and scale depth data, in one or more implementations, the 3D scene recovery system generates a depth map utilizing a depth prediction model to determine a predicted depth shift for the digital image. In addition, the 3D scene recovery system estimates an initial camera focal length, and in some instances, additional intrinsic camera parameters. Based on these initial depth and focal length intrinsic camera parameters, the 3D scene recovery system utilizes the 3D point cloud model to generate a depth adjustment factor and a focal length adjustment factor. The 3D scene recovery system then utilizes these adjustment factors to correct the initial depth and focal length to more accurately reflect the true and accurate depth and focal length of the input digital image.

In various implementations, the 3D scene recovery system can again utilize the 3D point cloud model in subsequent iterations to further refine the depth and focal length to accurately match those of the input digital image. Based on the corrected or refined parameters (e.g., depth and focal length), the 3D scene recovery system can generate an accurate and realistic 3D scene representation (e.g., 3D point cloud) from the input digital image. Indeed, by recovering the depth shift and the intrinsic camera parameters of the input digital image, the 3D scene recovery system can construct a 3D scene representation of the digital image that provides the correct shape geometry of objects portrayed in the input digital image.

By way of empirical evidence, researchers have found that the implementations disclosed herein can provide increased accuracy over conventional systems. Indeed, Tables 1 and 2 below provide qualitative results of example implementations of the 3D scene recovery system outperforming conventional systems in terms of generating accurate 3D scene representations. Further, FIG. 7, which is described below, provides qualitative results of example embodiments of the 3D scene recovery system providing 3D scene representations that are more accurate compared to those of state-of-the-art systems.

Additionally, the 3D scene recovery system can also improve efficiency and flexibility relative to conventional systems. As mentioned above, the 3D scene recovery system is able to achieve an accurate 3D scene shape reconstruction from a single digital image. In this manner, the 3D scene recovery system is not limited to generating 3D scene representations from digital images having consecutive frames or multiple views of a scene. Indeed, the 3D scene recovery system can generate a 3D scene representation from single in-the-wild images including a single digital image captured on a user client device as well as previously captured single digital images for which multiple views are unavailable. Accordingly, the 3D scene recovery system can avoid the time and computational expense of capturing and processing multiple digital images while also expanding applicability to scenarios where only a single input digital image is available.

Moreover, in various implementations, the 3D scene recovery system can train the 3D point cloud model in a manner that flexibly adapts to training data. For example, the 3D scene recovery system can utilize both real and synthetically generated 3D scene representations without suffering from overfitting or domain gap problems. Indeed, because of how the 3D scene recovery system utilizes training data—to predict correct locations of points in three-dimensional space—the 3D scene recovery system can minimize the domain gap and address overfitting issues.

Additional detail regarding the 3D scene recovery system 106 will now be provided with reference to the figures. For example, FIG. 1 illustrates a schematic diagram of a digital medium system environment 100 in which a 3D scene recovery system 106 operates in accordance with one or more implementations. As shown in FIG. 1, the digital medium system environment 100 ("environment 100") includes a server device 102, and a client device 108 connected via a network 112. Additional detail regarding these computing devices is provided below in connection with FIG. 10. In addition, FIG. 10 also provides additional detail regarding networks, such as the illustrated network 112.

As shown, the server device 102 includes a content management system 104. The content management system 104 is able to perform a variety of functions. For example, in one or more embodiments, the content management system 104 facilitates the distribution of various digital content items across the network 112. In one or more implementations, the content management system 104 facilitates, identifies, receives, accesses, opens, loads, edits, modifies, moves, copies, shares, saves, removes, deletes, stores, downloads, transmits, and/or imports digital content. Examples of digital content include digital images, training images, depth maps, and 3D scene representations.

As illustrated, the content management system 104 includes a 3D scene recovery system 106 (e.g., a 3D scene recovery machine-learning system). While shown within the content management system 104, in various implementations, the 3D scene recovery system 106 is located apart from the content management system 104. Further, in some implementations, the 3D scene recovery system 106 is implemented on the client device 108 or across multiple computing devices (e.g., on both the server device 102 and the client device 108).

In one or more implementations, the 3D scene recovery system 106 trains and utilizes a 3D point cloud model to recover depth parameters and intrinsic camera parameters, including focal length, for an input digital image. As further described below, in various implementations, the 3D scene recovery system 106 utilizes a ground truth distortion and correction approach to recover these parameters of an input digital image. Further, once trained, in example implementations, the 3D scene recovery system 106 utilizes 3D point cloud neural networks within the 3D point cloud model to determine the refined depth and intrinsic camera parameters for the input digital image, as further described below.

For context, in many instances, a digital image (or simply "image") refers to a digital visual representation. For instance, a digital image can include digital graphics file that when rendered displays a three-dimensional scene. In various implementations, images are made up of pixels that group together to form a visual representation of objects and shapes. In many instances, images are two-dimensional files having horizontal and vertical coordinates (e.g., x, y coordinates). Additionally, in example implementations, an input digital image corresponds to a digital image that the 3D scene recovery system 106 utilizes to construct a 3D representation of the scene within the input digital image.

In a few implementations, an image may refer to a 3D scene representation. For example, in one or more implementations, a 3D scene representation refers to a scene portrayed in 3D space. For instance, a 3D scene representation includes points displayed on an x, y, and z coordinate system. Examples of 3D scene representations include 3D point clouds, a 3D scene renderings, and/or 3D digital images. Additionally, in many implementations, the 3D scene recovery system 106 generates 3D scene representations by unprojecting 2D coordinates of digital images into a 3D space by applying depth and intrinsic camera parameters to each point in the digital images.

Returning to FIG. 1, the environment 100 includes the client device 108. In some implementations, the client device 108 accesses the 3D scene recovery system 106. For instance, a 3D scene recovery application 110 on the client device 108 provides an input digital image (e.g., an input image) to the 3D scene recovery system 106 on the server device 102. In response, the 3D scene recovery system 106 generates and returns a 3D scene representation of the input digital image to the client device 108. In various implementations, the 3D scene recovery application 110 is a web browser or a mobile application that enables access to the 3D scene recovery system 106.

In some implementations, the 3D scene recovery application 110 represents an image editing application for editing digital images, or a portion thereof. In these and other implementations, the 3D scene recovery application 110 utilizes the 3D scene recovery system 106 to transform digital images into 3D scene representations. For example, the 3D scene recovery application 110 downloads a 3D point cloud model trained on the server device 102 and/or utilizes the 3D point cloud model on the server device 102 to generate a 3D scene representation of the scene in the input image.

Although FIG. 1 illustrates a particular number, type, and arrangement of components within the environment 100, various additional environment configurations are possible. For example, the server device 102 represents a set of connected server devices. Additionally, the server device 102 may communicate directly with the client device 108, bypassing the network 112, or utilizing a separate and/or an additional network. Further, in some implementations, the environment 100 includes additional components, such as additional client devices.

Figure 2A:
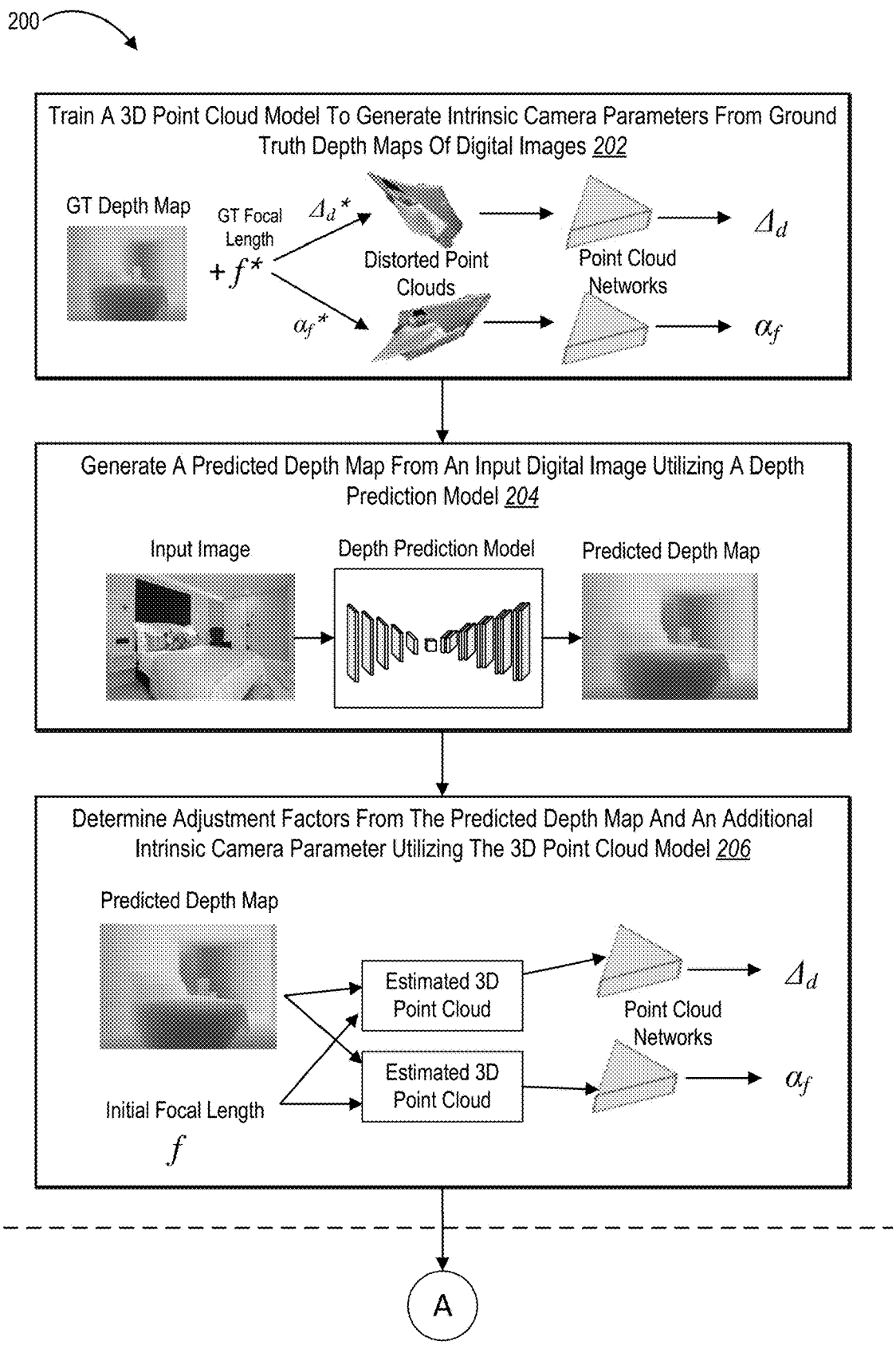
FIGS. 2A-2B illustrate an overview diagram of generating a 3D scene from a single input digital image based on recovering intrinsic camera parameters corresponding to the input digital image utilizing a 3D point cloud model in accordance with one or more implementations.
Figure 2B:
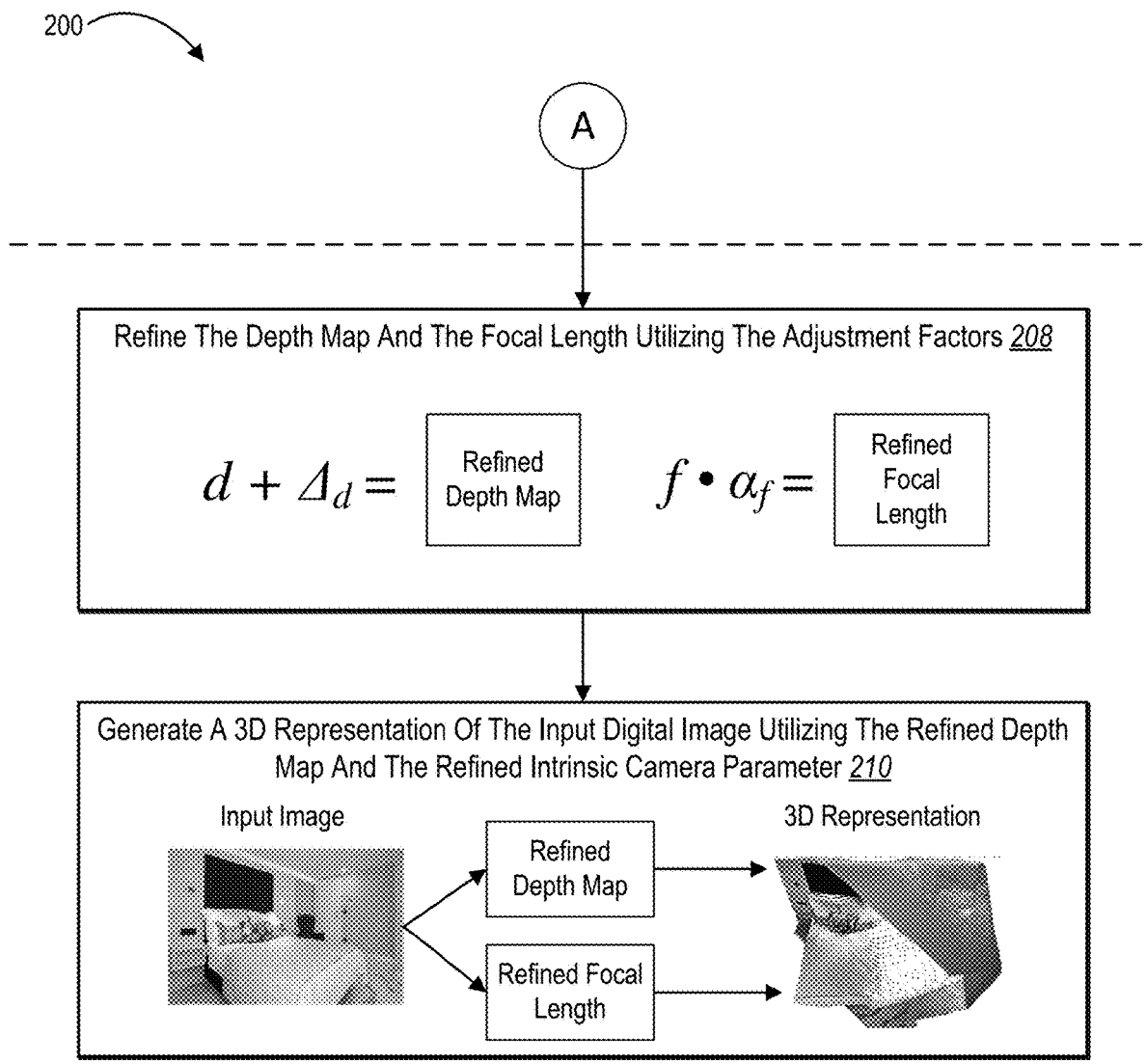

As indicated above, FIGS. 2A-2B illustrate an overview diagram of generating a 3D scene from a single input digital image utilizing a 3D point cloud model in accordance with one or more implementations. In particular, FIGS. 2A-2B include a series of acts 200 performed by the 3D scene recovery system 106 in training and utilizing a 3D point cloud model to recover intrinsic camera parameters corresponding to the input digital image, then generating a 3D scene representation from the intrinsic camera parameters.

In various implementations, the 3D scene recovery system 106 performs an act 202 of training a 3D point cloud model to generate intrinsic camera parameters from ground truth depth maps of digital images. In several implementations, a 3D point cloud model (or simply "point cloud model") includes 3D point cloud neural networks (or simply "point cloud neural networks") corresponding to different parameters. For example, the 3D scene recovery system 106 can utilize a depth point cloud neural network (for determining depth from an input point cloud) and/or a focal length point cloud neural network (for determining focal length from an input point cloud).

As shown in FIG. 2A in connection with the act 202, the 3D scene recovery system 106 utilizes a ground truth depth map and a ground truth focal length (i.e., f*) to generate training distortions, such as distorted ground truth adjustment factors (i.e., $\Delta^*_d$ and $\alpha^*_f$) and distorted point clouds. The 3D scene recovery system 106 can process the training distortions via the point cloud neural networks to generate predicted adjustment factors (i.e., $\Delta_d$ and $\alpha_f$). Further, in various implementations, the 3D scene recovery system 106 utilizes supervisory learning to tune the point cloud neural networks based on comparing the distorted ground truth adjustment factors with the predicted adjustment factors. Further detail regarding building and training the point cloud model is provided below with respect to FIG. 4.

As illustrated in FIG. 2A, the 3D scene recovery system 106 also performs an act 204 of generating a predicted depth map from an input digital image utilizing a depth prediction model. In some implementations, the 3D scene recovery system 106 trains a depth prediction model to generate depth maps from input images lacking depth data. In alternative implementations, the 3D scene recovery system 106 otherwise obtains a depth prediction model. Additional detail regarding utilizing a depth prediction model is provided below with respect to FIG. 5A.

For context, in one or more implementations, a depth map includes a digital representation of depth or distance (e.g., a depth map with values indicating a depth or distance from a camera). In particular, a depth map can include a digital image or another data structure having and/or portraying depth data (sometimes symbolized by "d") from a captured perspective such as depth shift and/or scale depth data. In various implementations, a depth map includes values of distances to objects, surfaces, edges, and/or planes located at different depths in a digital image.

As shown, the series of acts 200 in FIG. 2A includes an act 206 of the 3D scene recovery system 106 determining adjustment factors from the predicted depth map and an initial intrinsic camera parameter utilizing the 3D point cloud model. For example, as illustrated with respect to the act 206, the 3D scene recovery system 106 estimates 3D point clouds from the predicted depth map and an initial estimate of the focal length. The 3D scene recovery system 106 then processes the estimated 3D point clouds to determine adjustment factors, such as a depth adjustment factor (i.e., $\Delta_d$) and a focal length adjustment factor (i.e., $\alpha_f$), as shown. Additional detail regarding utilizing the 3D point cloud model is provided below with respect to FIGS. 5A-5B.

As illustrated in FIG. 2B, the series of acts 200 includes an act 208 of the 3D scene recovery system 106 refining the depth map and the focal length utilizing the adjustment factors. For example, in one or more implementations, the 3D scene recovery system 106 adds the depth adjustment factor to the predicted depth map to determine a refined depth map. Similarly, in various implementations, the 3D scene recovery system 106 corrects the initial focal length by applying the focal length adjustment factor to determine a refined focal length, which more closely resembles the focal length of the camera at the time the digital image is captured. In this manner, by correcting and refining the depth map and intrinsic camera parameters, the 3D scene recovery system 106 is able to accurately recover true and realistic camera parameters. Additional detail regarding refining depth parameters and intrinsic camera parameters is provided below with respect to FIGS. 5A-5B.

As shown, the series of acts 200 includes an act 210 of the 3D scene recovery system 106 generating a 3D representation of the input digital image utilizing the refined depth map and the refined intrinsic camera parameter. Indeed, with the depth and the intrinsic camera parameters of the input digital image accurately recovered, the 3D scene recovery system 106 can construct an accurate and realistic 3D scene representation of the input digital image by unprojecting the input digital image based on the refined depth map and the refined focal length. Additional detail regarding unprojecting digital images is provided below with respect to FIGS. 3A-3B and 5A-5B.

As mentioned above, in various implementations, the 3D scene recovery system 106 unprojects 2D digital images into 3D scene representations based on depth and focal length parameters. Indeed, the 3D scene recovery system 106 utilizes an unprojection process in both training and inferencing the 3D point cloud model. For example, the 3D scene recovery system 106 utilizes unprojection when constructing distorted point clouds in training as well as constructing estimated point clouds and 3D scene representation during inferencing. Accordingly, FIGS. 3A-3B illustrate block diagrams of unprojecting a 3D scene representation from a depth map, an intrinsic camera parameter (e.g., focal length), and a single input digital image.

Figure 3A:
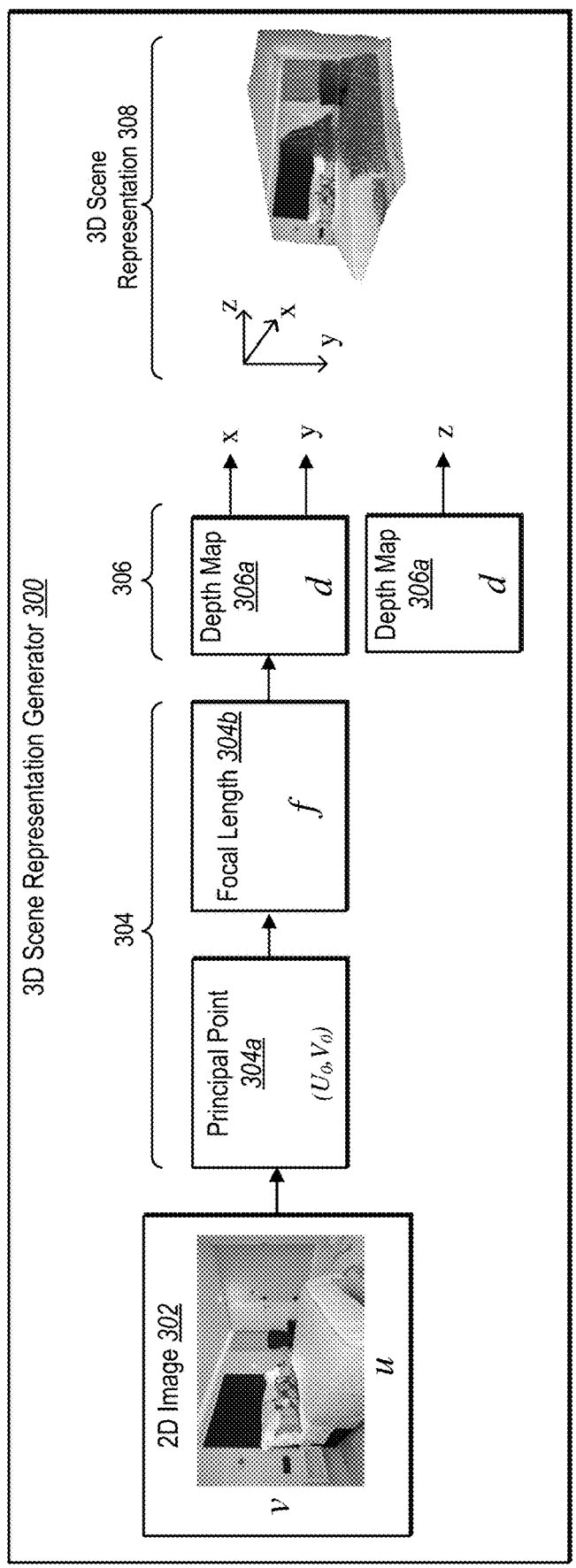
FIGS. 3A-3B illustrate block diagrams of unprojecting a 3D scene representation from a single input digital image, a depth map, and an intrinsic camera parameter in accordance with one or more implementations.
Figure 3B:
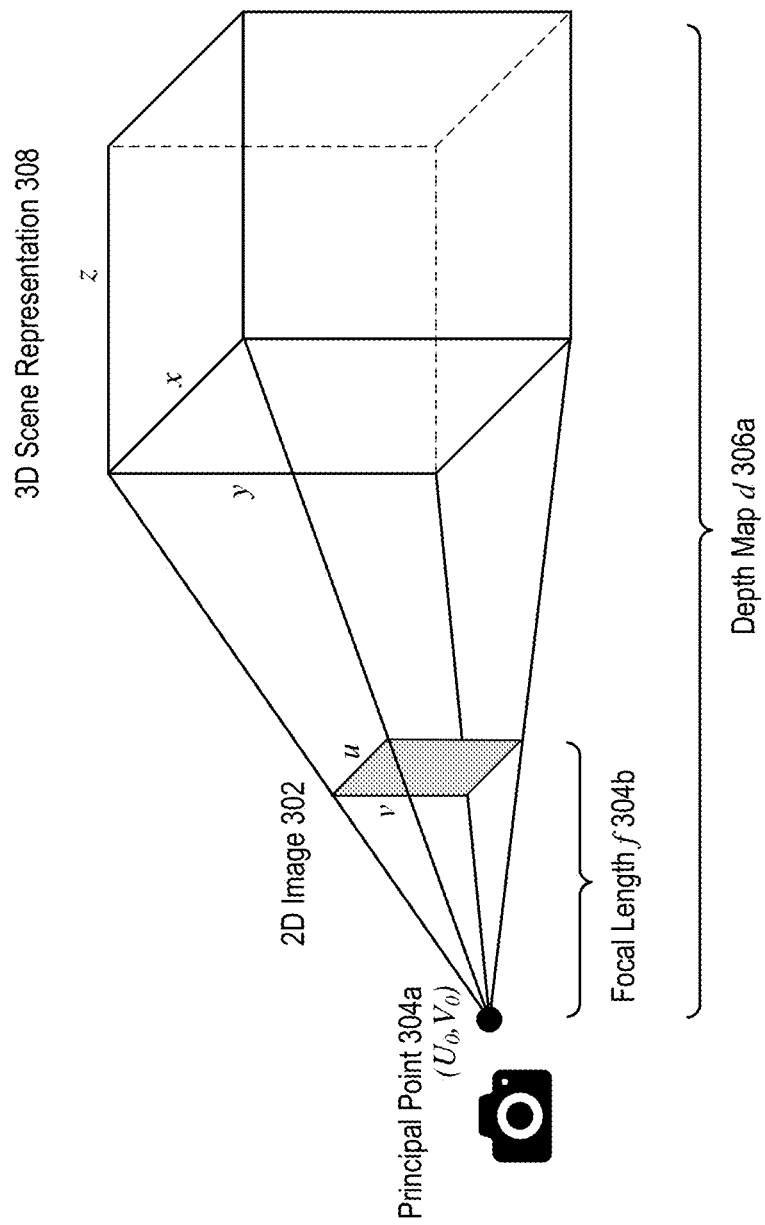

To illustrate, FIG. 3A shows a 3D scene representation generator 300 that includes a 2D image 302 from which the 3D scene recovery system 106 constructs a 3D scene representation 308. Further, the 3D scene representation generator 300 also includes intrinsic camera parameters 304 and depth data 306 that the 3D scene recovery system 106 utilizes to construct the 3D scene representation 308 (shown from the top view). As illustrated, the intrinsic camera parameters 304 include a principal point 304a (i.e., $U_0$, $V_0$) and a focal length 304b (i.e., f). The depth data 306 includes a depth map 306a (i.e., d).

By way of context, camera parameters refer to metrics that indicate relationships between 3D coordinates of points in a scene (measured by the light that comes into a camera) and 2D coordinates of the scene projected onto a 2D image plane (e.g., a digital image) for a camera model. Camera parameters include intrinsic camera parameters and extrinsic camera parameters. Examples of intrinsic camera parameters include camera focal length (or simply "focal length" often represented by $\alpha_f$ or f), image sensor format, principal point (e.g., the center of an image represented by $U_0$, $V_0$), lens distortion (e.g., narrow zoom, 55 mm, wide-angle, fisheye, etc.), sensor crop factors, and/or sensor pixel pitch. In some implementations, intrinsic camera parameters also include the shift depth of points in an image (e.g., an indication of the distance between surfaces of objects in the camera). In various implementations, one or more intrinsic camera parameters reside in metadata associated with an input digital image (e.g., a 2D image). Further, while the implementations described herein primarily refer to intrinsic camera parameters, similar actions and approaches can be applied to extrinsic camera parameters (e.g., camera pose, heading, height, position, etc.) to improve the reconstruction of 3D scene representations.

As shown in FIG. 3A, the 2D image 302 is labeled with a horizontal axis (i.e., u) and a vertical axis (i.e., v), which represent pixel coordinates of the 2D image 302. To unproject from these 2D coordinates to 3D coordinates of the 3D scene representation (i.e., x, y, z), in various implementations, the 3D scene recovery system 106 applies the intrinsic camera parameters 304 and the depth data 306.

To illustrate, in one or more implementations, the 3D scene recovery system 106 maps the u, v coordinates of each point in the 2D image 302 to the x, y coordinates of the 3D scene representation 308 utilizing the principal point 304a, the focal length 304b, and the depth map 306a. Further, the 3D scene recovery system 106 determines the z value of each point from the depth map. In many implementations, the 3D scene recovery system 106 follows the formulation provided in Equation 1 shown below.

$$\begin{cases} x = \dfrac{u - u_o}{f} d \\ y = \dfrac{v - v_o}{f} d \\ z = d \end{cases} \quad (1)$$

To further illustrate how the 3D scene recovery system 106 generates a 3D scene representation from a 2D image, FIG. 3B shows an example mapping of unprojecting the 2D image into a 3D space. As illustrated, FIG. 3B includes each of the elements of FIG. 3A, such as the 2D image 302, the 3D scene representation 308, the principal point 304a, the focal length 304b, and the depth map 306a.

As shown in the illustrated implementation, the unprojection is a factor of the position of the camera capturing the 2D image 302, which is represented by the principal point 304a. In various implementations, the distance between the principal point 304a and the pixels in the 2D image 302 is defined by the focal length 304b (i.e., f), as shown. Further, the location of the 3D scene representation 308 to the camera is defined by the distance between the principal point 304a and points in the 3D scene representation 308, where the distance is indicated in the depth map 306a (i.e., d), as shown (e.g., some points may be closer while others farther away based on their respective depth values).

As illustrated in FIG. 3B, the 3D scene recovery system 106 cannot determine the 3D scene representation 308 when either the depth or the focal length (e.g., shift and scale depth data) is unknown. Further, if either the depth or the focal length is inaccurate, the unprojection mapping between the camera, 2D image 302, and the 3D scene representation 308 becomes distorted. Accordingly, by recovering the correct intrinsic camera parameters and depth data for the 2D image utilizing the 3D point cloud model, the 3D scene recovery system 106 is able to accurately construct a realistic 3D scene representation.

Figure 4:
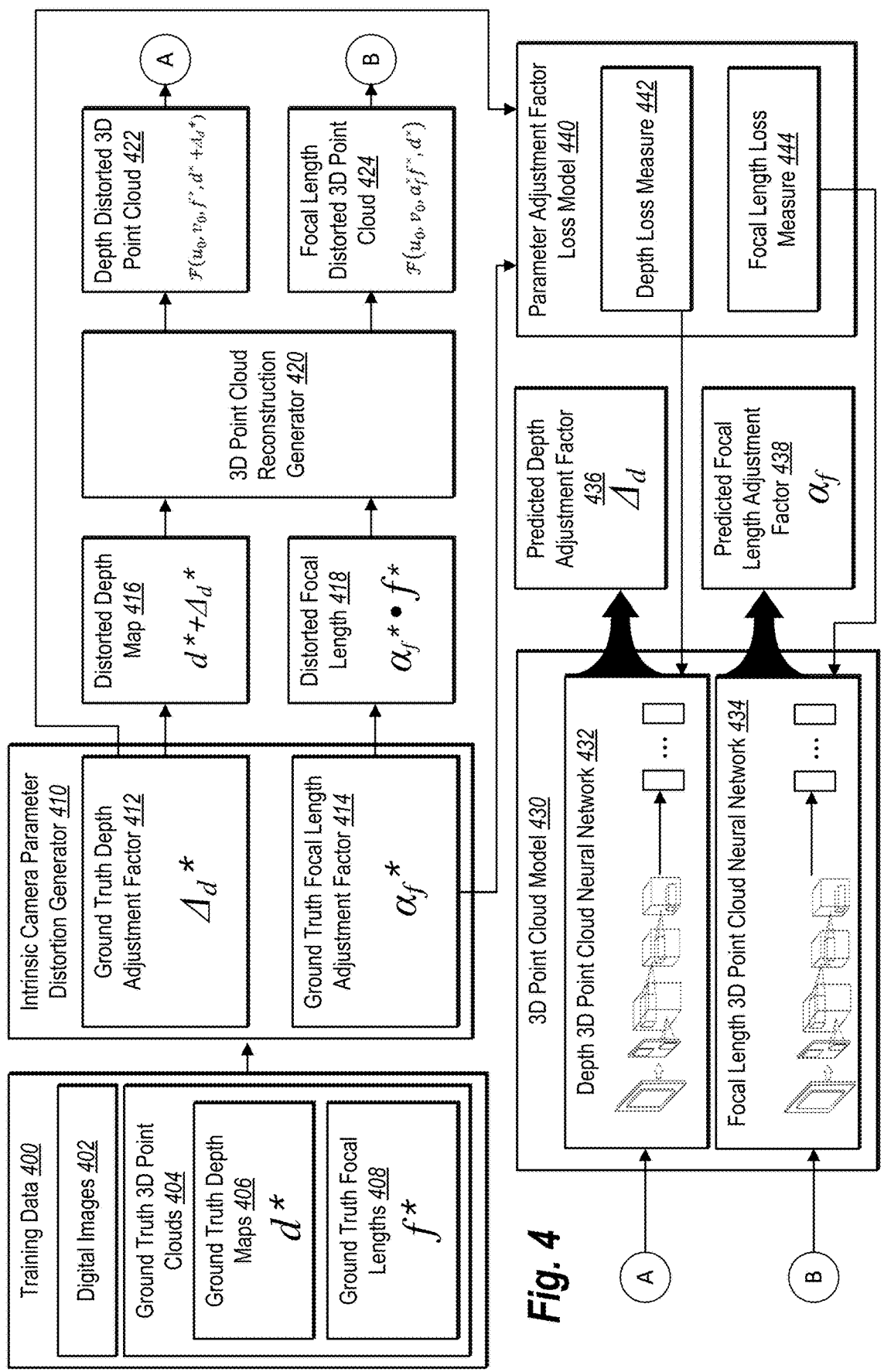
FIG. 4 illustrates a block diagram of training a 3D point cloud model in accordance with one or more implementations.

Turning to the next set of figures, additional detail is provided with respect to building a 3D point cloud model to accurately recover intrinsic camera parameters and depth data for an input digital image. To illustrate, FIG. 4 shows a block diagram of training a 3D point cloud model in accordance with one or more implementations. In various implementations, the 3D point cloud model illustrated in FIG. 4 is implemented by the 3D scene recovery system 106 on a server device and/or a client device. As shown, FIG. 4 includes a 3D point cloud model 430 (or simply "point cloud model 430") and various associated components including training data 400, an intrinsic camera parameter distortion generator 410, a 3D point cloud reconstruction generator 420, and a parameter adjustment factor loss model 440.

As illustrated, the training data 400 includes digital images 402 and ground truth 3D point clouds 404 that correspond to the digital images 402. Further, the ground truth 3D point clouds 404 (or simply "ground truth point clouds 404") include ground truth depth maps 406 (i.e., d*) and ground truth focal lengths 408 (i.e., f*). In one or more implementations, the ground truth point clouds 404 include additional intrinsic camera parameters, such as principal point or camera lens distortion, and/or extrinsic camera parameters. In some implementations, the training data 400 includes the digital images 402, the ground truth depth maps 406, and the ground truth focal lengths 408 without the ground truth 3D point clouds 404.

In various implementations, the training data 400 includes digital images from multiple data sources. For example, in one or more implementations, the training data includes calibrated-stereo digital images captured with a dual-lens device, LiDAR-captured depth images, and/or 3D synthetic digital images. Indeed, these types of digital images can include accompanying ground truth depth maps and other ground truth intrinsic camera parameters, such as focal length.

As mentioned above, in one or more implementations, the training data 400 includes 3D images. In these implementations, the 3D scene recovery system 106 can generate flat 2D images from the 3D images to determine ground truth depth data and ground truth intrinsic camera parameters needed for training. For instance, in some implementations, the digital images 402 are synthetic 3D images. As described above, because the point cloud model 430 is trained to determine where to place or move 3D points within 3D space, the 3D scene recovery system 106 is able to efficiently utilize 3D synthetic ground truth images without suffering from overfitting or domain gap issues.

As mentioned above, in many implementations, the 3D scene recovery system 106 employs a ground truth distortion recovery approach to train the point cloud model 430. For example, the 3D scene recovery system 106 distorts intrinsic camera parameter ground truths by a known, controlled amount, provides the distorted ground truths to the point cloud model 430, then trains the point cloud model 430 to recover the distortion amounts that restore the ground truths to their true, undistorted shape. Accordingly, in a number of implementations, the 3D scene recovery system 106 utilizes an intrinsic camera parameter distortion generator 410 to train the point cloud model 430.

As shown, the intrinsic camera parameter distortion generator 410 (or simply "distortion generator 410") includes a ground truth depth adjustment factor 412 (i.e., $\Delta^*_d$) and a ground truth focal length adjustment factor 414 (i.e., $\alpha^*_f$). In various implementations, the distortion generator 410 includes additional and/or different ground truth adjustment factors associated with other intrinsic camera parameters, such as a ground truth lens distortion adjustment factor, or extrinsic camera parameters.

In various implementations, the ground truth adjustment factors provide a known and controlled amount of distortion to ground truth samples from the training data 400. For example, in one or more implementations, the distortion generator 410 applies the ground truth depth adjustment factor 412 to a ground truth depth map 406 for a training image to generate a distorted depth map 416. In some implementations, the depth shift (i.e., the ground truth depth adjustment factor 412) that the 3D scene recovery system 106 utilizes to distort the ground truth depth map 406 falls within the range of −0.25-0.8, where a shift factor below zero distorts a depth map by decreasing depth and a shirt factor above zero distorts a depth map by increasing the depth factor.

Similarly, the distortion generator 410 applies the ground truth focal length adjustment factor 414 to the ground truth focal length 408 for the training image to generate a distorted focal length 418. In some implementations, the scale (i.e., the ground truth depth adjustment factor 412) that the 3D scene recovery system 106 utilizes to distort the ground truth focal length 408 falls within the range of 0.6-1.25 to keep the focal length positive and non-zero, where a scale factor below one decreases the focal length and a scale factor above one increases the focal length.

As shown, FIG. 4 includes the 3D point cloud reconstruction generator 420 (or simply "reconstruction generator 420"). In various implementations, the reconstruction generator 420 generates a 3D point cloud of an image based on depth parameters and intrinsic camera parameters (e.g., a depth map and focal length). In many implementations, the reconstruction generator 420 is an example of the 3D scene representation generator 300 described previously with respect to FIG. 3. For instance, the reconstruction generator 420 generates a 3D point cloud, which is an example of a 3D scene representation. For example, the reconstruction generator 420 utilizes the formulation provided in Equation 1 described above to generate a 3D point cloud.

In one or more implementations, the reconstruction generator 420 generates a depth distorted 3D point cloud 422 (i.e., $\mathcal{F}(u_0, v_0, f^*, d^*+\Delta^*_d)$). For example, the reconstruction generator 420 utilizes the distorted depth map 416 along with the undistorted ground truth focal length 408 for a training image to generate the depth distorted 3D point cloud 422 (e.g., a perturbed input 3D point cloud with an incorrect depth shift). In this manner, the reconstruction generator 420 isolates and controls for the depth map distortion of the depth distorted point cloud.

In similar implementations, the reconstruction generator 420 generates a focal length distorted 3D point cloud 424 (i.e., $\mathcal{F}(u_0, v_0, \alpha^*_f f^*, d^*)$). For example, the reconstruction generator 420 utilizes the distorted focal length 418 along with the undistorted ground truth depth map 406 for the same training image to generate the focal length distorted 3D point cloud 424 (e.g., a perturbed input 3D point cloud with an incorrect focal length). In alternative implementations, the reconstruction generator 420 generates a single combined distorted 3D point cloud from both the distorted depth map 416 and the distorted focal length for the training image, which can better represent real-world images in some instances.

As shown in the bottom half of FIG. 4, the 3D scene recovery system 106 provides the distorted 3D point clouds to the point cloud model 430. For instance, the point cloud model 430 processes the distorted 3D point clouds to recover the correct depth and focal length for the training image. In particular, the point cloud model 430 predicts a predicted depth adjustment factor 436 that reverses the depth distortion in the depth distorted 3D point cloud 422. Similarly, the point cloud model 430 predicts a predicted focal length adjustment factor 438 that reverses the focal length distortion in the focal length distorted 3D point cloud 424.

In one or more implementations, the point cloud model 430 is a machine-learning model that includes multiple 3D point cloud neural networks (or simply "point cloud neural networks"). For example, as shown, the point cloud model 430 includes a depth 3D point cloud neural network 432 and a focal length 3D point cloud neural network 434. In various implementations, the point cloud model 430 includes additional and/or different point cloud neural networks, such as a principal-point point-cloud neural network and/or a lens distortion point cloud neural network. In some implementations, the point cloud model 430 includes a combined 3D point cloud neural network that predicts both depth distortion adjustment factors as well as one or more intrinsic camera parameter adjustment factors.

By way of context, machine-learning models include algorithms that model high-level abstractions in data by generating data-driven predictions or decisions from the known input data. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandits models, linear regression models, logistical regression models, random forest models, support vector machines (SVG) models, neural networks (convolutional neural networks, recurrent neural networks such as LSTMs, graph neural networks, etc.), or decision tree models.

Further, a neural network includes a machine learning model having interconnected artificial neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using training data to tune parameters of the neural network. Neural network designs may include a convolutional neural network (CNN), a point-voxel CNN (PVCNN), recurrent neural network (RNN), and single-shot detect (SSD) networks. Examples of neural networks include a predicted depth neural network and 3D point cloud neural networks (e.g., a depth 3D point cloud neural network, a focal length 3D point cloud neural network, and/or an intrinsic camera parameter 3D point cloud neural network). A 3D point cloud neural network refers to a neural network that analyzes and/or process a three-dimensional point cloud (as input) to generate a prediction (e.g., a predicted camera parameter).

In various implementations, the architecture of the point cloud neural networks follow CNNs that encode and decode feature vectors from the input 3D point clouds. In one or more implementations, the point cloud neural networks follow architecture from a PVCNN. For instance, in example implementations, one or more point cloud neural networks include a low-resolution voxel-based branch and a high-resolution point-based branch, where the voxel-based branch extracts coarse-grained neighborhood information that is supplemented by the fine-grained individual point features extracted from the point-based branch. Additional details regarding the PVCNN architecture are disclosed in Zhijian et al., *Point-Voxel CNN for Efficient 3D Deep Learning*, published in "33rd Conference on Neural Information Processing Systems" (NeurIPS 2019), the entirety of which is incorporated herein by reference.

As mentioned above, in various implementations, the depth 3D point cloud neural network 432 processes the depth distorted 3D point cloud 422 to generate the predicted depth adjustment factor 436 (i.e., $\Delta_d$). In one or more implementations, the predicted depth adjustment factor 436 attempts to provide or recover an amount of depth shift (e.g., the predicted depth adjustment factor 436) that, when applied to the distorted depth map 416 corrects the distortion and restores the distorted depth map 416 to the ground truth depth map 406 for the training image. Similarly, the focal length 3D point cloud neural network 434 provides or recovers the predicted focal length adjustment factor 438 (i.e., $\alpha_f$) that restores the distorted focal length 418 to match the ground truth focal length 408 for the training image.

In various implementations, the 3D scene recovery system 106 iteratively trains the point cloud neural networks to determine accurate adjustment factors. Accordingly, in one or more implementations, the 3D scene recovery system 106 utilizes the parameter adjustment factor loss model 440 (or simply "loss model 440") to determine a measure of loss for each of the point cloud neural networks by comparing the predicted adjustment factors with the ground truth adjustment factors, as further described below. The 3D scene recovery system 106 can then tune the point cloud neural networks utilizing the loss measurements To illustrate, in one or more implementations, the 3D scene recovery system 106 utilizes the loss model 440 to determine a depth loss amount based on the predicted depth adjustment factor 436. For example, the 3D scene recovery system 106 compares a difference between the predicted depth adjustment factor 436 (i.e., $\Delta_d$) and the ground truth depth adjustment factor 412 (i.e., $\Delta^*_d$) to determine a depth loss measure 442 (e.g., a depth loss residue). In example implementations, the 3D scene recovery system 106 utilizes simple absolute error (SAE) to determine the depth loss measure 442. In some implementations, the 3D scene recovery system 106 backpropagates the depth loss measure 442 to the depth 3D point cloud neural network 432 to tune and optimize weights and parameters within the neural network layers of the neural network.

In one or more implementations, the 3D scene recovery system 106 represents the depth distorted 3D point cloud 422 as $\mathcal{F}(u_0, v_0, f^*, d^*+\Delta^*_d)$ and the depth 3D point cloud neural network 432 as $\mathcal{N}_d(\bullet)$. In some implementations, the 3D scene recovery system 106 trains the depth 3D point cloud neural network 432 utilizing the objective function shown in Equation 2 below to determine the depth loss measure 442 (i.e., $L_d$).

$$\mathcal{L}_d = \min_{\theta} |\mathcal{N}_d(F(u_0, v_0, f^*, d^* + \Delta^*_d), \theta) - \Delta^*_d| \qquad (2)$$

In Equation 2, $\theta$ may represent weights of the depth 3D point cloud neural network 432. Additionally, as described above, in various implementations, f* represents a ground truth focal length 408, d* represents a ground truth depth map 406, and $\Delta^*_d$ represents the ground truth depth map adjustment factor that the 3D scene recovery system 106 applies to the ground truth depth map 406 to generate the distorted depth map 416 (i.e., $d^*+\Delta_d$).

Similarly, in various implementations, the 3D scene recovery system 106 compares the difference between the predicted focal length adjustment factor 438 (i.e., $\alpha_f$) and the ground truth depth adjustment factor 412 (i.e., $\alpha_f^*$) to determine a focal length loss measure 444 (e.g., a focal length loss residue). In example implementations, the 3D scene recovery system 106 utilizes SAE to determine the focal length loss measure 444. In one or more implementations, the 3D scene recovery system 106 also backpropagates the focal length loss measure 444 to the focal length 3D point cloud neural network 434.

In some implementations, the 3D scene recovery system 106 represents the focal length distorted 3D point cloud 424 as $\mathcal{F}(u_0, v_0, \alpha^*_f f^*, d^*)$ and the focal length 3D point cloud neural network 434 as $\mathcal{N}_f(\bullet)$. In various implementations, the 3D scene recovery system 106 trains the focal length 3D point cloud neural network 434 utilizing the objective function shown in Equation 3 below to determine the focal length loss measure 444 (i.e., $L_f$).

$$\mathcal{L}_f = \min_\theta |\mathcal{N}_f(F(u_0, v_0, \alpha_f^* f^*, d^*), \theta) - \alpha_f^*| \quad (3)$$

In Equation 3, $\theta$ may represent weights of the focal length 3D point cloud neural network 434. Additionally, as described above, in various implementations, $\alpha_f^*$ represents a ground truth focal length adjustment factor 414 for a training image, $f^*$ represents a ground truth focal length 408, and $d^*$ represents a ground truth depth map 406. Further, $\alpha_f^* f^*$ may represent the distorted focal length based on the 3D scene recovery system 106 applying the ground truth focal length 408 to the ground truth focal length adjustment factor 414 for the training image.

As described above, in one or more implementations, the 3D scene recovery system 106 utilizes the measures of loss to train and optimize the neural network layers of the point cloud neural networks via backpropagation and/or end-to-end learning. In some implementations, the 3D scene recovery system 106 trains the point cloud neural networks in a supervised manner utilizing stochastic gradient descent (SGD), with an initial learning rate of 0.24 and a learning rate decay of 0.1. Further, in example implementations, the 3D scene recovery system 106 utilizes a training batch size of 40, however, other batch sizes can be utilized. Accordingly, the 3D scene recovery system 106 can iteratively tune and train the point cloud neural networks to learn sets of best-fit parameters that accurately recover depth data and intrinsic camera parameters. Further, by training the various point cloud neural networks, the 3D scene recovery system 106 builds and trains the point cloud model 430.

Figure 5A:
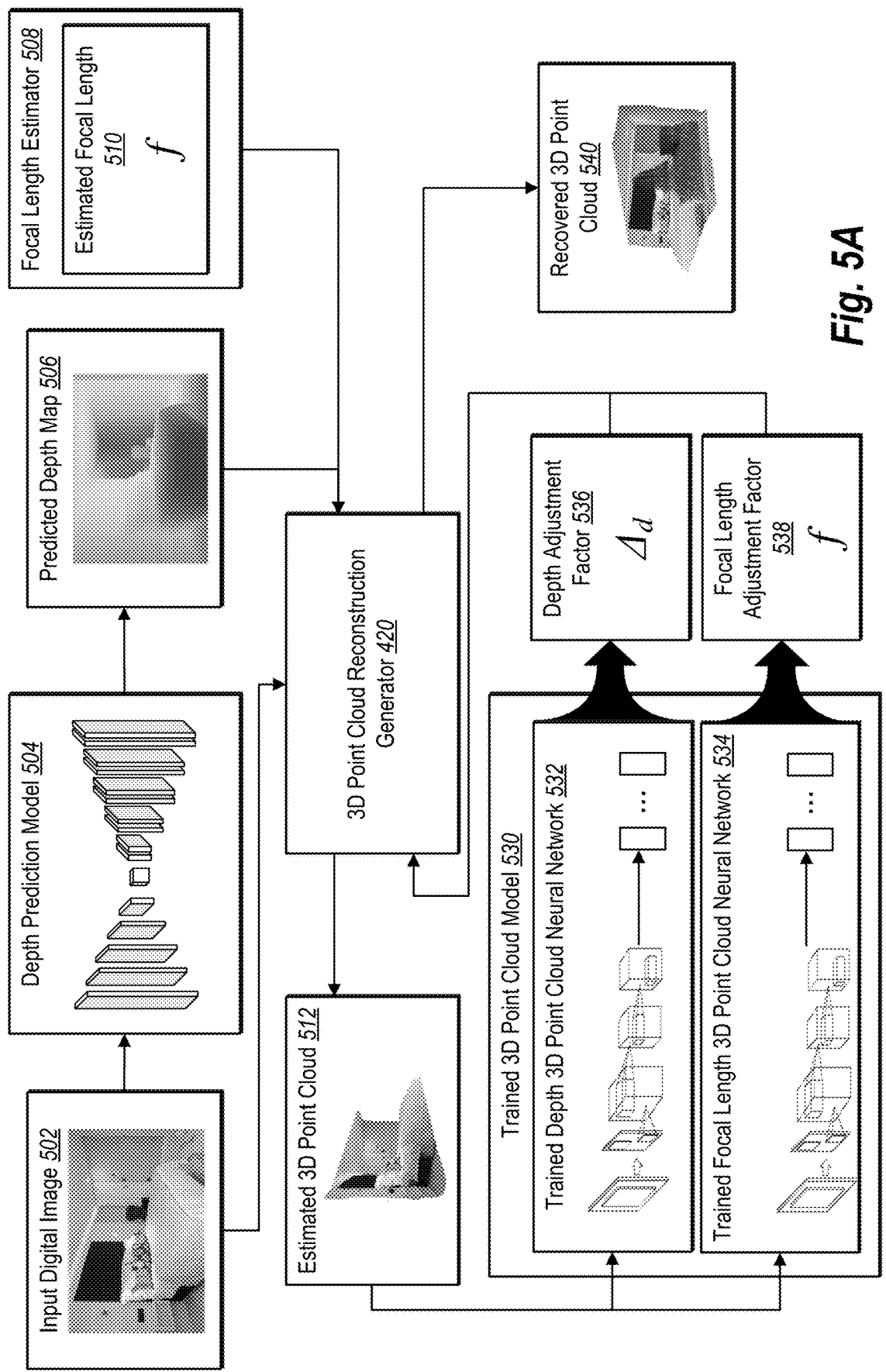
FIGS. 5A-5B illustrate block diagrams of utilizing a trained 3D point cloud model to generate a 3D scene from a single input digital image in accordance with one or more implementations.
Figure 5B:
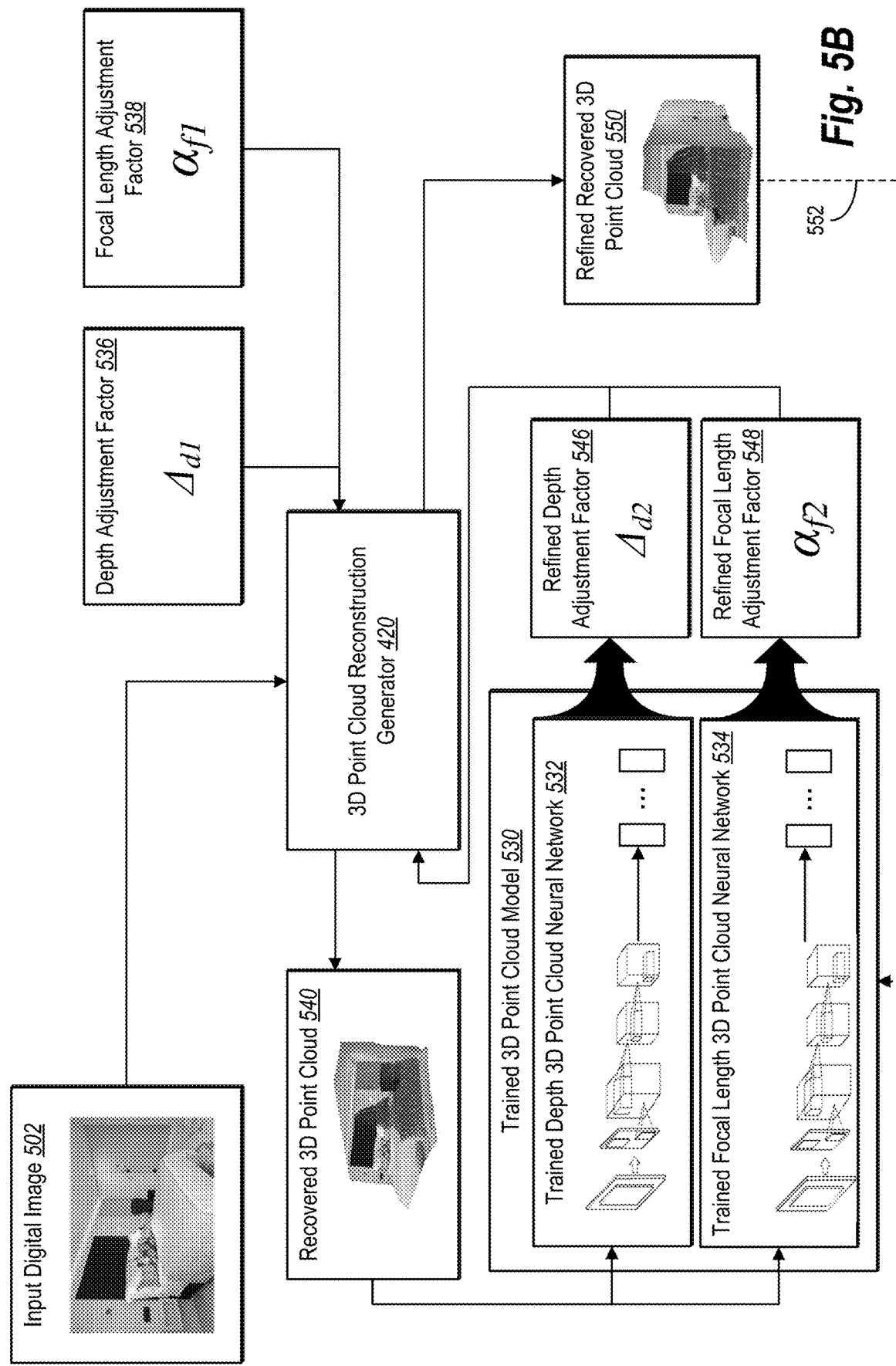

Once trained, in various implementations, the 3D scene recovery system 106 utilizes the point cloud model to recover the depth data and the intrinsic camera parameters from input digital images. To illustrate, FIGS. 5A-5B show block diagrams of utilizing a trained 3D point cloud model to generate a 3D scene from a single input digital image in accordance with one or more implementations. As shown, FIG. 5A includes an input digital image 502, a depth prediction model 504, a focal length estimator 508, the 3D point cloud reconstruction generator 420, and a trained 3D point cloud model 530.

As described above, the trained 3D point cloud model 530 recovers depth data and intrinsic camera parameters from 3D point clouds. Accordingly, in various implementations, upon receiving the input digital image 502 portraying a 3D scene, the 3D scene recovery system 106 first generates an initial or estimated 3D point cloud 512 of the input digital image. As also described above, to generate an estimated 3D point cloud 512, the 3D scene recovery system 106 utilizes a depth map of the input digital image 502. Accordingly, in one or more implementations, the 3D scene recovery system 106 generates a predicted depth map 506 of the input digital image 502.

In some implementations, the 3D scene recovery system 106 utilizes the depth prediction model 504 to generate the predicted depth map 506. In various implementations, the 3D scene recovery system 106 trains and utilizes the depth prediction model 504 to accurately detect depth data within the input digital image 502. In these implementations, the 3D scene recovery system 106 utilizes a different set of training data to train the depth prediction model 504 than employed to train the trained 3D point cloud model 530.

In some implementations, the 3D scene recovery system 106 otherwise obtains the depth prediction model 504. For example, in example implementations, the 3D scene recovery system 106 utilizes one or more implementations of the predicted depth machine-learning models described in U.S. patent application Ser. No. 17/186,436, Generating Depth Images Utilizing A Machine-Learning Model Built From Mixed Digital Image Sources And Multiple Loss Function Sets, filed Feb. 26, 2021 or W. Yin et al., *DiverseDepth: Affine-Invariant Depth Prediction Using Diverse Data*, arXiv preprint arXiv:2002.00569, 2020. Each of these references is incorporated herein by reference in their entirety.

As shown in FIG. 5A, in various implementations, the 3D scene recovery system 106 creates the estimated 3D point cloud 512 from the predicted depth map 506. As described above, the 3D point cloud reconstruction generator 420 can generate 3D point clouds from a depth map and focal length (and/or other intrinsic camera parameters). Indeed, the 3D point cloud reconstruction generator 420 is described above in connection with FIG. 4 and is an example of the 3D scene representation generator 300 described previously with respect to FIG. 3.

In various implementations, because the intrinsic camera parameters of the input digital image 502 are unknown, the 3D scene recovery system 106 utilizes initial or estimated parameters and then corrects them utilizing the trained 3D point cloud model 530. Accordingly, as shown, FIG. 5A includes the focal length estimator 508, which generates an estimated focal length 510 (i.e., f). In one or more implementations, the focal length estimator 508 utilizes a default factor for the estimated focal length 510. For example, in example implementations, the focal length estimator 508 utilizes an initial focal length with a field-of-view (FOV) of 60-degrees. In other implementations, the focal length estimator 508 selects a different FOV between 20-degrees and 70-degrees. In alternative implementations, the focal length estimator 508 utilizes a focal length model (e.g., a focal length machine-learning model) to predict the estimated focal length 510 from the input digital image 502.

In some implementations, the focal length estimator 508 determines the estimated focal length 510 based on metadata associated with the input digital image 502. For example, the focal length estimator 508 extracts an initial focal length or focal length data from exchangeable image file (EXIF) data or other metadata embedded within the input digital image 502. Notably, while FIG. 5A illustrates the focal length estimator 508, in some implementations, FIG. 5A includes additional and/or different intrinsic camera parameter estimators, such as an estimator for camera lens distortion or sensor pixel pitch, for which the trained 3D point cloud model 530 determines corresponding adjustment factors.

In one or more implementations, the focal length estimator 508 provides the estimated focal length 510 to the 3D point cloud reconstruction generator 420 along with the predicted depth map 506 to generate the estimated 3D point cloud 512. For example, in various implementations, the 3D scene recovery system 106 represents the estimated 3D point cloud 512 as $\mathcal{F}(u_0, v_0, f, d)$.

As mentioned above, in various implementations, the 3D scene recovery system 106 utilizes the trained 3D point cloud model 530 to recover accurate depth data and intrinsic camera parameters from a 3D point cloud. As shown, the trained 3D point cloud model 530 includes a trained depth 3D point cloud neural network 532 (i.e., $\mathcal{N}_d(\cdot)$) and a trained focal length point cloud neural network 534 (i.e., $\mathcal{N}_f(\cdot)$). In one or more implementations, the trained 3D point cloud model 530 includes additional and/or different trained camera parameter 3D point cloud neural networks, as described above.

As shown in FIG. 5A, the 3D scene recovery system 106 provides the estimated 3D point cloud 512 of the input digital image 502 to the trained 3D point cloud model 530. In one or more implementations, the 3D scene recovery system 106 provides one instance of the estimated 3D point cloud 512 to each point cloud neural network within the trained 3D point cloud model 530. In alternative implementations, the 3D scene recovery system 106 provides separate instances of the estimated 3D point cloud 512 to each point cloud neural network. For example, the 3D scene recovery system 106 provides an estimated 3D point cloud 512 to both the trained depth 3D point cloud neural network 532 and the trained focal length point cloud neural network 534.

In various implementations, the trained depth 3D point cloud neural network 532 generates a depth adjustment factor 536 (i.e., $\Delta_d$) from the estimated 3D point cloud 512 of the input digital image 502. In particular, the trained depth 3D point cloud neural network 532 determines the amount of depth shift needed to correct the initial depth data from the predicted depth map 506 and recover the true depth of the 3D scene in the input digital image 502. In example implementations, this process is represented as $\mathcal{N}_d(\mathcal{F}(u_0, v_0, f, d)) = \Delta_d$.

Similarly, in one or more implementations, the trained focal length point cloud neural network 534 generates a focal length adjustment factor 538 (i.e., $\alpha_f$) from the estimated 3D point cloud 512. In particular, the trained focal length point cloud neural network 534 determines, separate from the trained depth 3D point cloud neural network 532, a focal length scale factor needed to correct the initial focal length from the estimated focal length 510 and recover the true focal length of the 3D scene in the input digital image 502. In example implementations, this process is represented as $\mathcal{N}_f(\mathcal{F}(u_0, v_0, f, d)) = \alpha_f$.

As shown, the 3D scene recovery system 106 generates a recovered 3D point cloud 540 based on the depth adjustment factor 536 and the focal length adjustment factor 538. For example, in one or more implementations, the 3D scene recovery system 106 provides the depth adjustment factor 536 and the focal length adjustment factor 538 to the 3D point cloud reconstruction generator 420.

To illustrate, in various implementations, the 3D point cloud reconstruction generator 420 receives the depth adjustment factor 536 (i.e., $\Delta_d$) and the focal length adjustment factor 538 (i.e., $\alpha_f$). In addition, the 3D point cloud reconstruction generator 420 receives (or maintains) the predicted depth map 506 (i.e., d) and the estimated focal length 510 (i.e., f). In one or more implementations, the 3D point cloud reconstruction generator 420 combines the depth adjustment factor 536 (i.e., $\Delta_d$) and the predicted depth map 506 (i.e., d) to determine an adjusted depth map (i.e., $d+\Delta_d$).

Additionally, the 3D point cloud reconstruction generator 420 applies the estimated focal length 510 (i.e., f) to the focal length adjustment factor 538 (i.e., $\alpha_f$) to determine an adjusted focal length (i.e., $\alpha_f f$ or $\alpha_f f$). The 3D point cloud reconstruction generator 420 then, as described above, generates the recovered 3D point cloud 540 utilizing the adjusted depth map, the adjusted focal length, and pixels of the input digital image 502, where the recovered 3D point cloud 540 is a 3D representation of the scene portrayed in the input digital image 502.

In various implementations, the 3D scene recovery system 106 generates a 3D rendering of the input digital image 502 utilizing the recovered 3D point cloud 540. For example, the 3D scene recovery system 106 renders a virtual model utilizing the recovered 3D point cloud 540. In some implementations, the 3D scene recovery system 106 utilizes the recovered 3D point cloud 540 to generate a physical model of an object portrayed in the input digital image 502.

As described above, in many implementations, the 3D scene recovery system 106 utilizes the trained 3D point cloud model 530 to generate a 3D scene representation of the input digital image 502. In some implementations, the 3D scene recovery system 106 utilizes the trained 3D point cloud model 530 for one or more additional iterations to further refine the adjusted factors. Indeed, in one or more implementations, the 3D scene recovery system 106 iteratively refines the adjustment factors in an attempt to recover the true depth and intrinsic camera parameter values of the input digital image 502.

To further illustrate, FIG. 5B shows the 3D scene recovery system 106 utilizing the trained 3D point cloud model 530 to further refine the depth adjustment factor 536 and the focal length adjustment factor 538. As shown, FIG. 5B includes many of the components included in FIG. 5A, such as the input digital image 502, the 3D point cloud reconstruction generator 420, and the trained 3D point cloud model 530 having the trained depth 3D point cloud neural network 532 and the trained 3D focal length point cloud neural network. Further, FIG. 5B includes the depth adjustment factor 536 (i.e., $\Delta_{d1}$), the focal length adjustment factor 538 (i.e., $\alpha_{f1}$), the recovered 3D point cloud 540, which are described previously.

As described above, in various implementations, the 3D scene recovery system 106 generates the recovered 3D point cloud 540 based on the input digital image 502, the depth adjustment factor 536, and the focal length adjustment factor 538. In some implementations, the 3D scene recovery system 106 provides the recovered 3D point cloud 540 to the trained 3D point cloud model 530 for further processing. For example, as shown, the 3D scene recovery system 106 provides the recovered 3D point cloud 540 to the trained depth 3D point cloud neural network 532 and the trained 3D focal length point cloud neural network 534.

In one or more implementations, the trained depth 3D point cloud neural network 532 generates a refined depth adjustment factor 546 (i.e., $\Delta_{d2}$) from the recovered 3D point cloud 540. Similarly, in some implementations, the trained 3D focal length point cloud neural network 534 generates a refined focal length adjustment factor 548 (i.e., $\alpha_{f2}$).

Moreover, as shown, in various implementations, the 3D scene recovery system 106 generates a refined recovered 3D point cloud 550 from the refined depth adjustment factor 546 and the refined focal length adjustment factor 548 utilizing the 3D point cloud reconstruction generator 420. For example, in one or more implementations, the 3D scene recovery system 106 combines the refined depth adjustment factor 546 (i.e., $\Delta_{d2}$) and the adjusted depth map (i.e., $d+\Delta_{d1}$) to determine a further-adjusted depth map (i.e., $d+\Delta_{d1}+\Delta_{d2}$). Stated differently, in some implementations, the 3D point cloud reconstruction generator 420 combines the predicted depth map 506 (i.e., d) with both the depth adjustment factor 536 (i.e., $\Delta_{d1}$) and the refined depth adjustment factor 546 (i.e., $\Delta_{d2}$) to determine the further-adjusted depth map (i.e., $d+\Delta_{d1}+\Delta_{d2}$).

In alternative implementations, the refined depth adjustment factor 546 (i.e., $\Delta_{d2}$) incorporates the depth adjustment factor 536 (i.e., $\Delta_{d1}$). In these implementations, the 3D point cloud reconstruction generator 420 combines the refined depth adjustment factor 546 (i.e., $\Delta_{d2}$) and the predicted depth map 506 (i.e., d) to determine the further-adjusted depth map (i.e., d+$\Delta_{d2}$).

Similarly, in one or more implementations, the 3D scene recovery system 106 determines a further-adjusted focal length based on the refined focal length adjustment factor 548. For instance, in one or more implementations, the 3D point cloud reconstruction generator 420 first applies the estimated focal length 510 (i.e., j) to a combination of the focal length adjustment factor 538 (i.e., $\alpha_{f1}$) and the refined focal length adjustment factor 548 (i.e., $\alpha_{f2}$) to determine the further-adjusted depth map ((i.e., f·($\alpha_{f1}+\alpha_{f2}$). In some implementations, the 3D scene recovery system 106 applies the refined focal length factor 548 (i.e., $\alpha_{d2}$) to the adjusted focal length (i.e., $\alpha_{f1}$·f) to determine a further-adjusted depth map (i.e., ($\alpha_{f1}$·f)·$\alpha_{d2}$). In alternative implementations, the refined focal length adjustment factor 548 (i.e., $\alpha_{f2}$) incorporates the focal length adjustment factor 538 (i.e., $\alpha_{f1}$). In these implementations, the 3D point cloud reconstruction generator 420 applies the refined focal length adjustment factor 548 (i.e., $\alpha_{f2}$) and to the estimated depth map 510 (i.e., f) to determine the further-adjusted depth map (i.e., $\alpha_{f2}$·f).

In some implementations, the 3D scene recovery system 106 provides the refined recovered 3D point cloud 550 to a client device for display. In various implementations, the 3D point cloud reconstruction generator 420 utilizes the further-adjusted depth map and the further-adjusted depth map along with pixels of the input digital image 502, as described above, to generate the refined recovered 3D point cloud 550. In some implementations, the 3D scene recovery system 106 provides the refined recovered 3D point cloud 550 to a client device for display or to another computing device for further processing.

As shown by the dashed arrow 552, in some implementations, the 3D scene recovery system 106 can repeat the refinement process for one or more additional iterations. For example, the 3D scene recovery system 106 feeds the refined recovered 3D point cloud 550 through the trained 3D point cloud model 530 for another iteration of processing, which generates further-refined adjustment factors. The 3D scene recovery system 106 can then generate a further-refined recovered 3D point cloud, as explained previously. Indeed, in example implementations, the 3D scene recovery system 106 performs a predetermined number of refinement iterations, such as two, three, four, or more iterations. In alternative implementations, the 3D scene recovery system 106 iterates until the generated 3D point cloud satisfies a 3D point cloud threshold.

FIGS. 4, 5A, and 5B describe various embodiments of training and inferencing a trained 3D point cloud model, which includes 3D point cloud neural networks. Accordingly, the actions and algorithms described in connection with FIGS. 4, 5A, and 5B provide example structures for performing a step for determining a focal length and depth shift corresponding to the single input digital image. Indeed, FIGS. 4, 5A, and 5B provide support for actions, steps, equations, and algorithms for performing the step for determining a focal length and depth shift corresponding to the single input digital image.

As described above, the 3D scene recovery system 106 can generate accurate and realistic 3D scene representations of an input digital image 502 utilizing the trained 3D point cloud model 530. To illustrate, FIG. 6 shows sample results of the trained 3D point cloud model reconstructing 3D point clouds from input digital images in accordance with one or more implementations.

Figure 6:
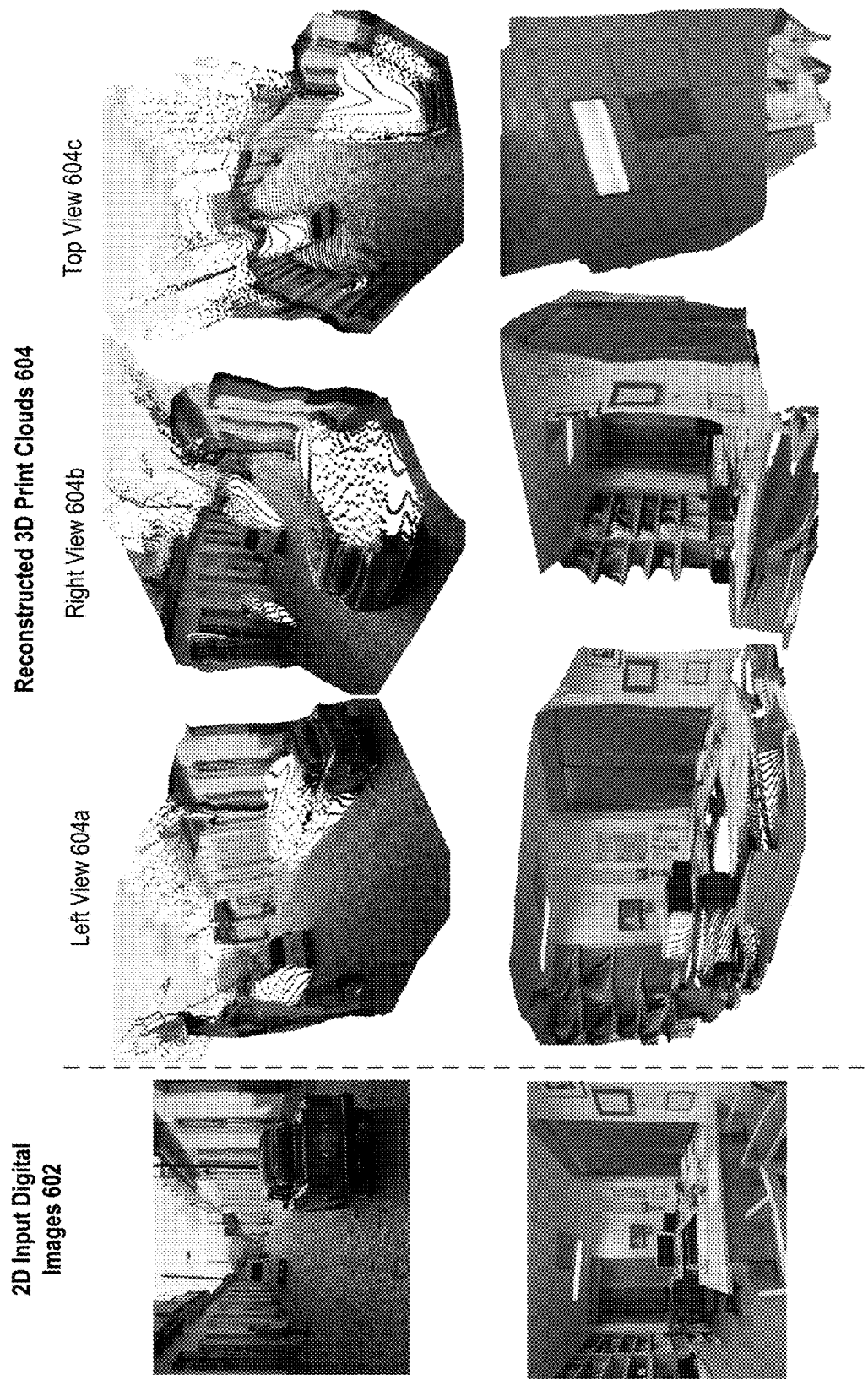
FIG. 6 illustrates sample results of the trained 3D point cloud model reconstructing 3D point clouds from input digital images in accordance with one or more implementations.

As shown, FIG. 6 includes 2D input digital images 602 in the first column on the left and reconstructed 3D point clouds 604 in the remaining columns. In particular, the reconstructed 3D point clouds 604 include a left view 604a, a right view 604b, and a top view 604c. As shown, the 3D scene recovery system 106 is able to take an input digital image lacking depth data and accurately recover both the depth data and intrinsic camera parameters (such as focal length) utilizing a trained 3D point cloud model, as described herein.

Figure 7:
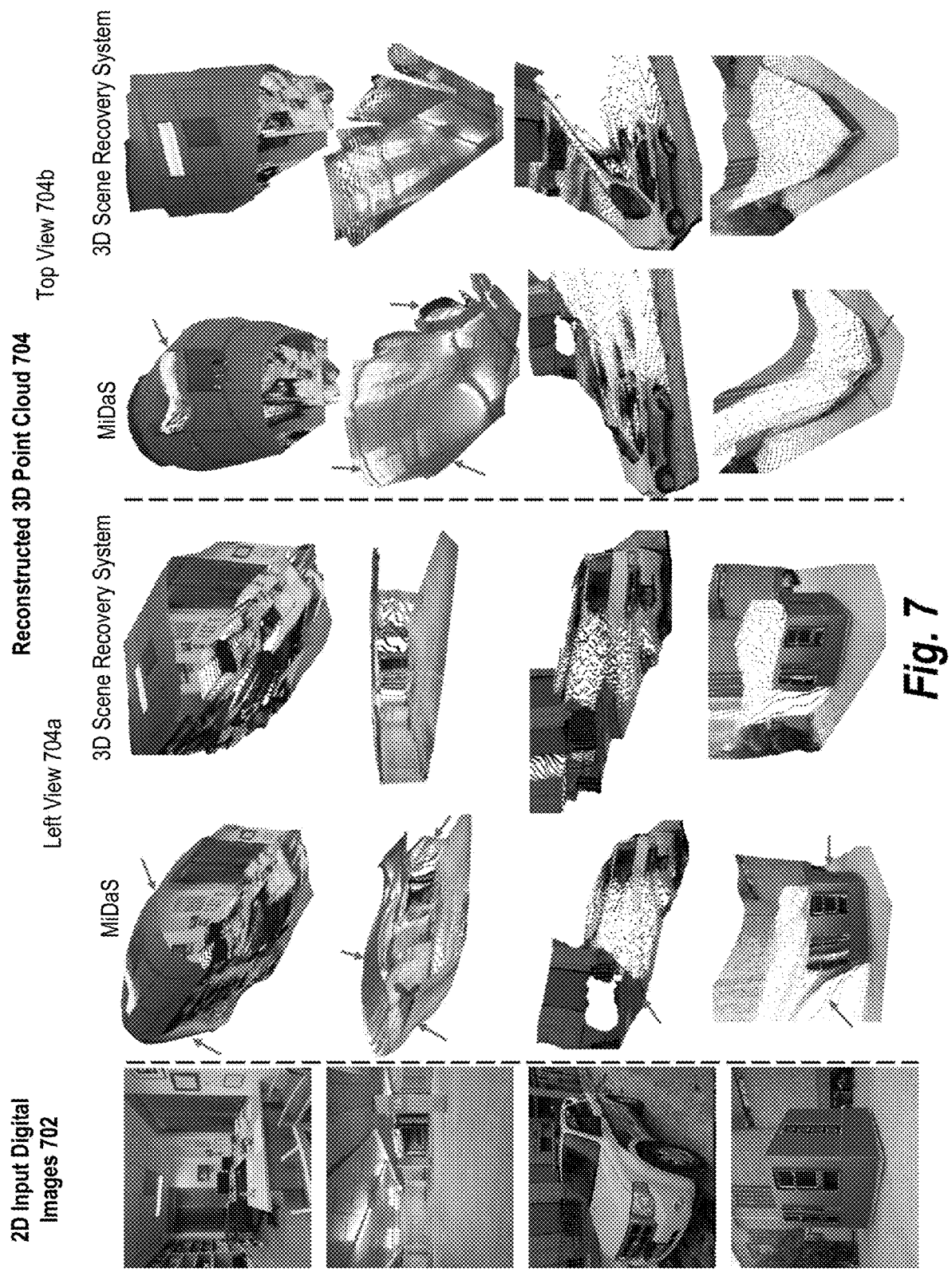
FIG. 7 illustrates visual results comparing one or more implementations of the 3D scene recovery system with a state-of-the-art system.

To further illustrate the performance of the 3D scene recovery system 106, FIG. 7 illustrates visual qualitative results comparing one or more implementations of the 3D scene recovery system with a state-of-the-art system. In particular, an example implementation of the 3D scene recovery system 106 is compared against a model disclosed in Ranftl et al., *Towards Robust Monocular Depth Estimation: Mixing Datasets For Zero-Shot Cross-Dataset Transfer*, published in IEEE Transactions of Pattern Analysis and Machine Intelligence, 2020 (hereafter "*MiDaS*"). As *MiDaS* does not estimate focal length, the method from Y. Hold-Geoffroy et al., *A Perceptual Measure For Deep Single Image Camera Calibration*, published on pages 2354-2363 of the Proceedings of IEEE Computer Society Conference on Computer Vision and Pattern Recognition, 2018, (hereafter "*Perceptual Measuring*") was used to recover the focal length, which along with a depth map from *MiDaS* was used to generate a reconstructed 3D point cloud.

To illustrate, FIG. 7 includes 2D digital images 702 in the left column and reconstructed 3D point clouds 704 in the center and right columns. In particular, the reconstructed 3D point clouds 704 includes a left view 704a between *MiDaS* and the 3D scene recovery system 106 and a right view 704b between *MiDaS* and the 3D scene recovery system 106.

As shown, the example implementation of the 3D scene recovery system 106 better reconstructs the 3D shape in the reconstructed 3D point clouds 704. In particular, the example implementation of the 3D scene recovery system 106 more accurately and realistically recovers straighter edges and less distorted and planar regions (e.g., see arrows showing the distortion in the *MiDaS* point clouds). Indeed, the planar structures, such as walls, floors, and roads are much flatter in the reconstructed 3D scenes generated by the 3D scene recovery system 106. Similarly, the angles between surfaces (e.g. walls) are also more realistic and the shape of the car has fewer distortions in the reconstructed 3D scenes generated by the 3D scene recovery system.

Quantitative results confirmed the results shown in FIG. 7, as demonstrated in Table 1 below.

TABLE 1

| Method | OASIS LSIV↓ | 2D-3D-S LSIV↓ |
|---|---|---|
| MiDaS + Perceptual Measuring | 1.60 | 0.94 |
| MiDaS + Point Cloud Model | 1.32 | 0.94 |
| 3D Scene Recovery System | 0.52 | 0.80 |

As shown, Table 1 provides a comparison of an example implementation of the 3D scene recovery system 106 and the *MiDaS* model evaluated with a pinhole camera model. Specifically, the first row in Table 1 includes the *MiDaS* model with the *Perceptual Measuring* model, which corresponds to the results shown in FIG. 7 and *MiDaS*. The second row includes the *MiDaS* model with the trained 3D point cloud model of one or more implementations disclosed herein. The third row shows the example implementation of the 3D scene recovery system 106, including the depth prediction model and the trained 3D point cloud model. In addition, Table 1 shows evaluation results of the reconstructed 3D shape quality on the OASIS dataset and the 2D-3D-S dataset. The various models are measured using a Locally Scale-Invariant RMSE (LSIV) metric, which matches how accurately a recovered 3D shape matches a corresponding ground truth shape. Fox context, with LSIV, a lower score indicates a smaller error and, thus, a more accurate model.

For context, the OASIS dataset and LSIV are described in W. Chen et al., *Oasis: A Large-Scale Dataset For Single Image 3D In The Wild*, published on pages 679-688 of the Proceedings of IEEE Computer Society Conference on Computer Vision and Pattern Recognition, 2020. The 2D-3D-S dataset is described in I. Armeni et al., *Joint 2D-3D-Semantic Data For Indoor Scene Understanding*, arXiv preprint arXiv: 1702.01105, 2017. In addition, OASIS provides a ground truth point cloud on small regions, while 2D-3D-S provides a ground truth point cloud for entire 3D scenes.

As shown in Table 1, the 3D scene recovery system 106 can achieve the highest accuracy with respect to both datasets. Further, the second row of the *MiDaS* model with the trained 3D point cloud model shows that the trained 3D point cloud model is able to generalize to different depth prediction methods. It also shows that the trained 3D point cloud model itself provides the same or improved accuracy over the *Perceptual Measuring* method.

Additional evaluations were also compared with respect to depth shift recovery and focal length recovery. Regarding depth shift recovery, zero-shot evaluations were performed on five datasets with data unseen during testing. In these evaluations, a 3D point cloud was recovered by unprojecting a predicted depth map. Next, the depth shift was determined using one or more implementations of the trained 3D point cloud model disclosed herein. Further, any unknown scale was aligned with ground truths. Finally, evaluations were performed using the absolute relative error (AbsRel), where lower values indicate more accurate results.

The results of the evaluation are shown in Table 2 below. As shown in Table 2, the AbsRel error of one or more implementations of the 3D scene recovery system 106 is lower after recovering the shift across all datasets.

TABLE 2

| Method | ETH3D | NYU | KITTI | Sintel | DIODE |
|---|---|---|---|---|---|
|  |  |  | AbsRel↓ |  |  |
| Baseline | 23.7 | 25.8 | 23.3 | 47.4 | 46.8 |
| 3D Scene Recovery System | 15.9 | 15.1 | 17.5 | 40.3 | 36.9 |

As shown, Table 2 includes evaluation results indicating the effectiveness of recovering depth shift from 3D point clouds utilizing one or more implementations of the trained 3D point cloud model disclosed herein. Compared with the baseline, the AbsRel for the 3D scene recovery system 106 is much lower after recovering the depth shift over all data sets tested.

Regarding focal length recovery, evaluations were performed with respect to the accuracy of recovering the focal length of a 2D digital image. In these evaluations, one or more implementations of the 3D scene recovery system 106 were compared using a zero-shot evaluation against methods in *Perceptual Measuring*. In these evaluations, the 3D scene recovery system 106 outperformed *Perceptual Measuring* at each vertical field-of-view (FOV) error compared.

Furthermore, the effect of different initial focal lengths was analyzed during inference. In these evaluations, the initial FOV was set from 20-degrees to 70-degrees. Then the accuracy of the recovered focal length was evaluated. The results indicate that the 3D scene recovery system 106 is not particularly sensitive to different initial focal lengths and performs robustly across a wide range of focal lengths (e.g., slight degradation in accuracy started below 25-degrees and above 65-degrees).

Figure 8:
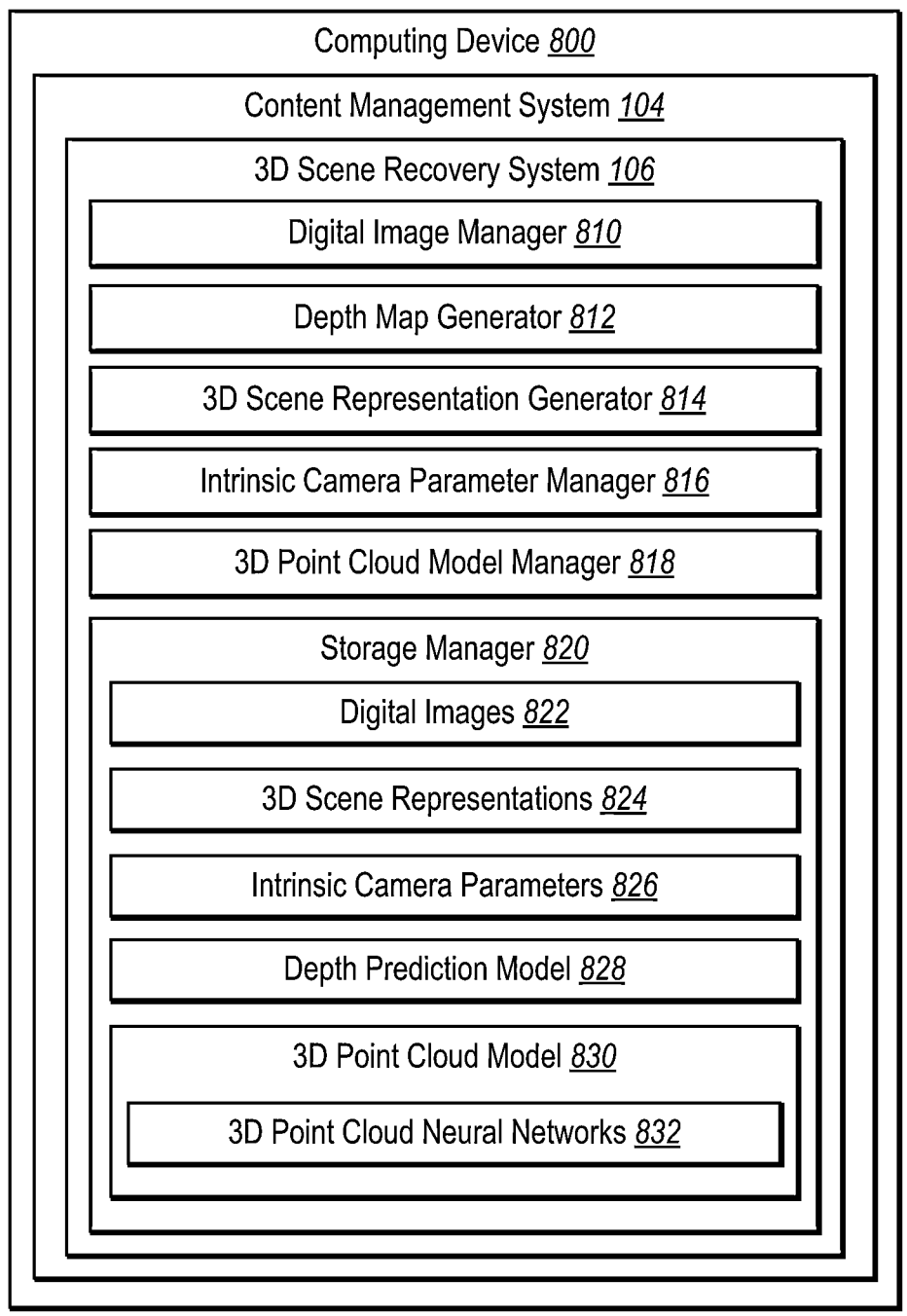
FIG. 8 illustrates a schematic diagram of the 3D scene recovery system in accordance with one or more implementations.

Referring now to FIG. 8, additional detail is provided regarding the capabilities and components of a 3D scene recovery system 106 in accordance with one or more implementations. In particular, FIG. 8 shows a schematic diagram of an example architecture of the 3D scene recovery system 106 implemented within a content management system 104 and hosted on a computing device 800.

In addition, the computing device 800 may represent various types of computing devices (e.g., the server device 102 and/or the client device 108). For example, in one or more implementations, the computing device 800 is a non-mobile computing device, such as a server, a cluster of servers, a desktop, or another type of non-mobile computing device. In some implementations, the computing device 800 is a mobile computing device, such as a laptop, a tablet, a mobile telephone, a smartphone, a wearable device, or a device connected to the internet. Additional details with regard to the computing device 800 are discussed below with respect to FIG. 10.

As shown, the computing device 800 includes the content management system 104, which is described above, and the 3D scene recovery system 106. The 3D scene recovery system 106 includes various components for performing the processes and features described herein. To illustrate, the 3D scene recovery system 106 includes a digital image manager 810, a depth map generator 812, a 3D scene representation generator 814, an intrinsic camera parameter manager 816, a 3D point cloud model manager 818, and a storage manager 820. As shown, the storage manager 820 includes digital images 822, 3D scene representations 824, intrinsic camera parameters 826, a depth prediction model 828, and a 3D point cloud model 830 having 3D point cloud neural networks 832.

As mentioned above, the 3D scene recovery system 106 includes the digital image manager 810. In general, the digital image manager 810 facilitates identifying, accessing, receiving, obtaining, generating, importing, exporting, copying, modifying, removing, providing, and organizing digital images 822. For example, the digital image manager 810 provides digital images 822 from training datasets to the 3D scene recovery system 106 for training a depth prediction model 828. In some implementations, the digital image manager 810 communicates with the storage manager 820 to store and retrieve the digital images 822, which may also include depth maps and/or 3D scene representations (e.g., 3D point clouds).

As shown, the 3D scene recovery system 106 includes the depth map generator 812. In one or more implementations, the depth map generator 812 facilitates generating, creating, estimating, modifying, removing, providing, and organizing depth maps. For example, in some implementations, the depth map generator 812 utilizes the depth prediction model 828 to generate a predicted depth map from an input digital image, as described above. Moreover, in example implementations, the depth map generator 812 may facilitate providing depth data and parameters to various components of the 3D scene recovery system 106, as described above.

As shown, the 3D scene recovery system 106 includes the 3D scene representation generator 814. In various implementations, the 3D scene representation generator 814 facilitates generating, creating, estimating, modifying, removing, providing, and organizing 3D scene representations 824, which may include 3D point clouds and/or 3D rendering. In one or more implementations, the 3D scene representation generator 814 reconstructs 3D scene representations 824 from depth data and intrinsic camera parameters 826, as previously described.

As shown, the 3D scene recovery system 106 includes the intrinsic camera parameter manager 816. In example implementations, the intrinsic camera parameter manager 816 facilitates identifying, accessing, receiving, obtaining, generating, importing, exporting, copying, modifying, removing, providing, and organizing intrinsic camera parameters 826. In various implementations, the intrinsic camera parameters 826 include focal length, camera lens distortion, and principal points of a camera model. In one or more implementations, the intrinsic camera parameter manager 816 is a camera parameter manager that manages both the intrinsic camera parameters 816 and/or extrinsic camera parameters, as described above.

As shown, the 3D scene recovery system 106 includes the 3D point cloud model manager 818. In various implementations, the 3D point cloud model manager 818 maintains, creates, generates, trains, updates, accesses, and/or utilizes the 3D point cloud models 830 disclosed herein. For example, the 3D point cloud model manager 818 trains and tunes the 3D point cloud neural networks 832 (e.g., depth and focal length point cloud neural networks) within the 3D point cloud model 830. Further, the 3D point cloud model manager 818 adds robustness and accuracy to the point cloud model 830 utilizing various loss and optimization functions, as described above.

Each of the components 810-832 of the 3D scene recovery system 106 may include software, hardware, or both. For example, the components 810-832 may include one or more instructions stored on a computer-readable storage medium and executable by processors of one or more computing devices, such as a client device (e.g., a mobile client device) or server device. When executed by the processors, the computer-executable instructions of the 3D scene recovery system 106 may cause a computing device to perform the feature learning methods described herein. Alternatively, the components 810-832 may include hardware, such as a special-purpose processing device to perform a certain function or group of functions. In addition, the components 810-832 of the 3D scene recovery system 106 may include a combination of computer-executable instructions and hardware.

Furthermore, the components 810-832 of the 3D scene recovery system 106 may be implemented as one or more operating systems, as one or more stand-alone applications, as one or more modules of an application, as one or more plug-ins, as one or more library functions or functions that may be called by other applications, and/or as a cloud-computing model. Thus, the components 810-832 may be implemented as a stand-alone application, such as a desktop or mobile application. Additionally, the components 810-832 may be implemented as one or more web-based applications hosted on a remote server. The components 810-832 may also be implemented in a suite of mobile device applications or "apps." To illustrate, the components 810-832 may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications or software packages. The foregoing are either registered trademarks or trademarks of Adobe Inc. in the United States and/or other countries.

FIGS. 1-8, the corresponding text, and the examples provide several different methods, systems, devices, and non-transitory computer-readable media of the 3D scene recovery system 106. In addition to the foregoing, one or more implementations may also be described in terms of flowcharts comprising acts for accomplishing a particular result, such as the flowchart of acts shown in FIG. 9. Additionally, the acts described herein may be repeated or performed in parallel with one another or parallel with different instances of the same or similar acts.

Figure 9:
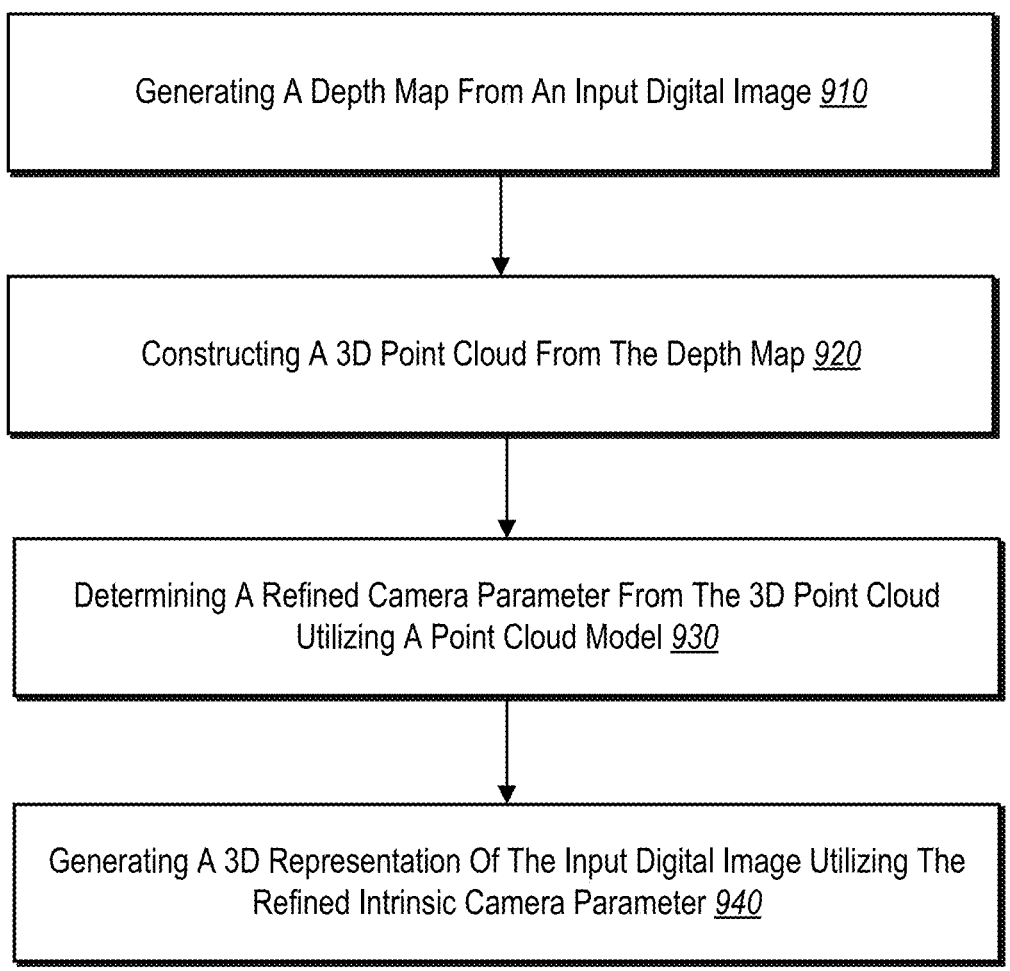
FIG. 9 illustrates a flowchart of a series of acts for generating three-dimensional scene representations from isolated digital images in accordance with one or more implementations.

While FIG. 9 illustrates acts according to one or more implementations, alternative implementations may omit, add to, reorder, and/or modify any of the acts shown in FIG. 9. The acts of FIG. 9 may be performed as part of one or more methods. Alternatively, non-transitory computer-readable mediums may comprise instructions that, when executed by one or more processors, cause a computing device to perform the acts of FIG. 9. In some implementations, one or more systems may perform the acts of FIG. 9.

In one or more implementations, the series of acts are implemented on one or more computing devices, such as the server device 102, the client device 108, or the computing device 800. In addition, in some implementations, the series of acts are implemented in a digital medium environment for editing digital images. For example, the series of acts are implemented on a computing device having memory that includes an input digital image, a depth prediction model, a focal length three-dimensional point cloud neural network, and a depth three-dimensional point cloud neural network.

As mentioned previously, FIG. 9 illustrates a flowchart of a series of acts 900 of generating depth images utilizing depth prediction machine-learning models in accordance with one or more implementations. The series of acts 900 includes an act 910 of generating a depth map from an input digital image. In particular, the act 910 may involve generating a depth map from an input digital image utilizing a depth prediction model. In one or more implementations, the act 910 includes receiving a single input digital image portraying a three-dimensional scene.

As shown, the series of acts 900 also includes an act 920 of constructing a 3D point cloud from the depth map. In particular, the act 920 may involve constructing an initial three-dimensional point cloud from the depth map utilizing an estimated intrinsic camera parameter. In some implementations, the act 920 includes constructing an initial three-dimensional point cloud from the depth map utilizing an estimated focal length. In one or more implementations, the act 920 includes selecting at least one of a focal length parameter, a principal point, or a camera lens distortion parameter. In various implementations, the act 920 includes determining x and y values of a point on the initial three-dimensional point cloud by applying the focal length to a corresponding point on the input digital image and determining a z value of the point on the initial three-dimensional point cloud by applying a depth from a corresponding point on the depth map to the point on the initial three-dimensional point cloud.

As shown, the series of acts 900 also includes an act 930 of determining a refined camera parameter from the 3D point cloud utilizing a point cloud model. In particular, the act 930 may involve determining a refined intrinsic camera parameter for the input digital image from the initial three-dimensional point cloud utilizing a point cloud neural network. In some implementations, the act 930 includes generating an intrinsic camera parameter adjustment factor by processing the initial three-dimensional point cloud utilizing the point cloud neural network and adjusting the estimated intrinsic camera parameter by the intrinsic camera parameter adjustment factor to generate the refined intrinsic camera parameter.

In various implementations, the point cloud model comprises one or more point cloud neural networks. In some implementations, the act 930 includes generating a plurality of intrinsic camera parameters by processing the initial three-dimensional point cloud utilizing a plurality of point cloud neural networks each trained to refine a separate intrinsic camera parameter of the plurality of intrinsic camera parameters. For example, in some implementations, the act 930 includes generating a depth adjustment factor by processing the initial three-dimensional point cloud utilizing a depth point cloud neural network and generating a focal length adjustment factor by processing the initial three-dimensional point cloud utilizing a focal length point cloud neural network.

In one or more implementations, the act 930 includes determining a refined focal length by processing the initial three-dimensional point cloud utilizing the focal length three-dimensional point cloud neural network. In some implementations, the act 930 also includes determining the refined focal length by generating a focal length adjustment factor by processing the initial three-dimensional point cloud utilizing the focal length three-dimensional point cloud neural network and adjusting the estimated focal length based on the focal length adjustment factor to generate the refined focal length.

In some implementations, the act 930 includes determining a refined depth map by processing the initial three-dimensional point cloud utilizing the depth three-dimensional point cloud neural network. In various implementations, the act 930 includes determining the refined depth map by generating a depth adjustment factor by processing the initial three-dimensional point cloud utilizing the depth three-dimensional point cloud neural network and determining the refined depth map by shifting depths within the depth map by the depth adjustment factor. In example implementations, the act 930 includes refining one or more intrinsic camera parameters by processing the initial three-dimensional point cloud utilizing one or more additional intrinsic camera parameter three-dimensional point cloud neural networks.

As shown, the series of acts 900 also includes an act 940 of generating a 3D representation of the input digital image utilizing the refined intrinsic camera parameter. In particular, the act 940 may involve generating a three-dimensional representation of the input digital image utilizing the refined intrinsic camera parameter. In one or more implementations, the act 940 includes generating a three-dimensional representation from the input digital image utilizing the refined depth map and the refined focal length.

In example implementations, the act 940 includes generating an updated three-dimensional point cloud utilizing the refined intrinsic camera parameter; determining a further-refined intrinsic camera parameter for the input digital image by utilizing the point cloud neural network to process the updated three-dimensional point cloud, and generating the three-dimensional representation utilizing the further-refined intrinsic camera parameter. In some implementations, the act 940 includes unprojecting the input digital image into a refined three-dimensional point cloud based on a refined depth map, the refined intrinsic camera parameter, and the input digital image.

In various implementations, the act 940 includes generating a refined three-dimensional point cloud or a rendering of a three-dimensional scene portrayed in the input digital image and providing the three-dimensional point cloud or the rendering of the three-dimensional scene for display on a client device. In some implementations, the act 940 includes constructing an updated three-dimensional point cloud from the refined depth map and the refined focal length, determining a further-refined focal length by processing the updated three-dimensional point cloud utilizing the focal length three-dimensional point cloud neural network, and generating the three-dimensional representation from the input digital image utilizing the further-refined focal length. In example implementations, the act 940 includes generating the three-dimensional representation from the input digital image utilizing the refined depth map, the refined focal length, and the one or more refined intrinsic camera parameters.

In some implementations, the act 940 includes unprojecting the single input digital image to the three-dimensional representation based on applying a depth map modified by the depth shift and the focal length to points of the single input digital image. In various implementations, the three-dimensional representation includes a three-dimensional point cloud of the three-dimensional scene portrayed in the input digital image. In one or more implementations, the act 940 includes generating a three-dimensional representation of the three-dimensional scene from the single input digital image utilizing the focal length and the depth shift and/or providing the three-dimensional representation of the three-dimensional scene to a client device for display. In various implementations, providing the three-dimensional representation for display to the client device includes providing the three-dimensional point cloud within a graphical user interface of the client device.

The series of acts 900 may include various additional acts. For example, the series of acts 900 may include an act of building or training the point cloud neural network by distorting a ground truth intrinsic camera parameter by a ground truth intrinsic camera parameter adjustment factor to generate a distorted ground truth intrinsic camera parameter, generating a distorted three-dimensional point cloud based on the distorted ground truth intrinsic camera parameter, determining a predicted intrinsic camera parameter adjustment factor by processing the distorted three-dimensional point cloud utilizing the point cloud neural network, and/or updating the point cloud neural network based on comparing the predicted intrinsic camera parameter adjustment factor and the ground truth intrinsic camera parameter adjustment factor.

For example, in various implementations, the series of acts 900 may include an act building or training the point cloud neural network by distorting a ground truth focal length by a ground truth focal length adjustment factor to generate a distorted focal length, generating a distorted three-dimensional point cloud based on the distorted focal length, determining a predicted focal length adjustment factor by processing the distorted three-dimensional point cloud utilizing the focal length three-dimensional point cloud neural network, and updating the focal length three-dimensional point cloud neural network based on comparing the predicted focal length adjustment factor and the ground truth focal length adjustment factor.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the 3D scene recovery system to generate and utilize the depth prediction model and the point cloud model, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 10:
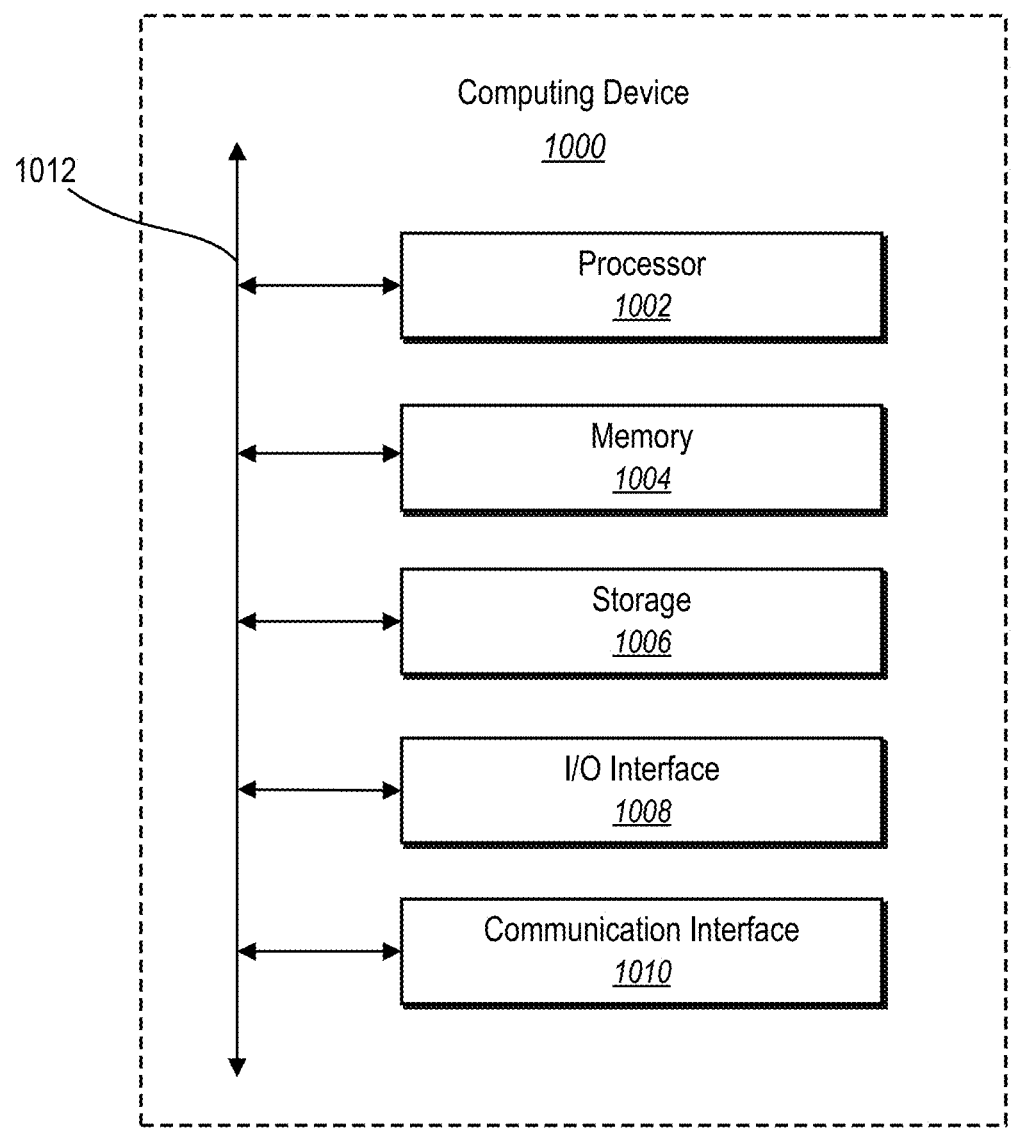
FIG. 10 illustrates a block diagram of an example computing device for implementing one or more implementations of the present disclosure.

FIG. 10 illustrates a block diagram of an example computing device 1000 that may be configured to perform one or more of the processes described above. One will appreciate that one or more computing devices, such as server device 102, the client device 108, or the computing device 800. In one or more implementations, the computing device 1000 may be a non-mobile device (e.g., a desktop computer, a server device, a web server, a file server, a social networking system, a program server, an application store, or a content provider). Further, the computing device 1000 may be a server device that includes cloud-based processing and storage capabilities. In some implementations, the computing device 1000 may be a mobile device (e.g., a laptop, a tablet, a smartphone, a mobile telephone, a camera, a tracker, a watch, a wearable device, etc.).

As shown in FIG. 10, the computing device 1000 may include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 may include a non-transitory storage medium described above. The storage device 1006 may include a hard disk drive (HDD), flash memory, a Universal Serial Bus (USB) drive, or a combination of these or other storage devices.

As shown, the computing device 1000 includes one or more I/O interfaces 1008, which are provided to allow a user to provide input to (e.g., user strokes), receive output from, and otherwise transfer data to and from the computing device 1000. These I/O interfaces 1008 may include a mouse, keypad, or a keyboard, a touch screen, camera, optical scanner, network interface, modem, other known I/O devices, or a combination of these I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 may further include a communication interface 1010. The communication interface 1010 may include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 may further include a bus 1012. The bus 1012 may include hardware, software, or both that connects components of computing device 1000 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   generate a depth map from an input digital image utilizing a depth prediction model;
   construct an initial three-dimensional point cloud from the depth map utilizing an estimated intrinsic camera parameter;
   determine a refined intrinsic camera parameter for the input digital image from the initial three-dimensional point cloud utilizing a point cloud neural network; and
   generate a three-dimensional representation of the input digital image utilizing the refined intrinsic camera parameter.

2. The non-transitory computer-readable medium of claim 1, further comprising instructions that, when executed by the at least one processor, cause the computing device to determine the refined intrinsic camera parameter for the input digital image by:

generating an intrinsic camera parameter adjustment factor by processing the initial three-dimensional point cloud utilizing the point cloud neural network; and adjusting the estimated intrinsic camera parameter by the intrinsic camera parameter adjustment factor to generate the refined intrinsic camera parameter.

3. The non-transitory computer-readable medium of claim 1, further comprising instructions that, when executed by the at least one processor, cause the computing device to generate the three-dimensional representation by:

generating an updated three-dimensional point cloud utilizing the refined intrinsic camera parameter;

determining a further-refined intrinsic camera parameter for the input digital image by utilizing the point cloud neural network to process the updated three-dimensional point cloud; and generating the three-dimensional representation utilizing the further-refined intrinsic camera parameter.

4. The non-transitory computer-readable medium of claim 1, further comprising instructions that, when executed by the at least one processor, cause the computing device to determine the estimated intrinsic camera parameter by selecting at least one of a focal length parameter, a principal point, or a camera lens distortion parameter.

5. The non-transitory computer-readable medium of claim 1, further comprising instructions that, when executed by the at least one processor, cause the computing device to generate the three-dimensional representation of the input digital image by unprojecting the input digital image into a refined three-dimensional point cloud based on a refined depth map, the refined intrinsic camera parameter, and the input digital image.

6. The non-transitory computer-readable medium of claim 1, further comprising instructions that, when executed by the at least one processor, cause the computing device to:

generate the three-dimensional representation by generating a refined three-dimensional point cloud or a rendering of a three-dimensional scene portrayed in the input digital image; and provide the refined three-dimensional point cloud or the rendering of the three-dimensional scene for display on a client device.

7. The non-transitory computer-readable medium of claim 1, further comprising instructions that, when executed by the at least one processor, cause the computing device to generate a plurality of intrinsic camera parameters by processing the initial three-dimensional point cloud utilizing a plurality of point cloud neural networks each trained to refine a separate intrinsic camera parameter of the plurality of intrinsic camera parameters.

8. The non-transitory computer-readable medium of claim 7, further comprising instructions that, when executed by the at least one processor, cause the computing device to:

generate a depth adjustment factor by processing the initial three-dimensional point cloud utilizing a depth point cloud neural network; and generate the refined intrinsic camera parameter comprising a focal length adjustment factor by processing the initial three-dimensional point cloud utilizing a focal length point cloud neural network.

9. The non-transitory computer-readable medium of claim 1, further comprising instructions that, when executed by the at least one processor, cause the computing device to:

distort a ground truth intrinsic camera parameter by a ground truth intrinsic camera parameter adjustment factor to generate a distorted ground truth intrinsic camera parameter; and generate a distorted three-dimensional point cloud based on the distorted ground truth intrinsic camera parameter.

10. The non-transitory computer-readable medium of claim 9, further comprising instructions that, when executed by the at least one processor, generate cause the computing device to:

determine a predicted intrinsic camera parameter adjustment factor by processing the distorted three-dimensional point cloud utilizing the point cloud neural network; and update the point cloud neural network based on comparing the predicted intrinsic camera parameter adjustment factor and the ground truth intrinsic camera parameter adjustment factor.

11. A system for generating three-dimensional digital images, the system comprising:

one or more memory devices comprising an input digital image, a depth prediction model, a focal length three-dimensional point cloud neural network, and a depth three-dimensional point cloud neural network;

at least one server device configured to cause the system to:

generate a depth map of the input digital image utilizing the depth prediction model;

construct an initial three-dimensional point cloud from the depth map utilizing an estimated focal length;

determine a refined focal length by processing the initial three-dimensional point cloud utilizing the focal length three-dimensional point cloud neural network;

determine a refined depth map by processing the initial three-dimensional point cloud utilizing the depth three-dimensional point cloud neural network; and generate a three-dimensional representation from the input digital image utilizing the refined depth map and the refined focal length.

12. The system of claim 11, wherein the at least one server device is further configured to cause the system to determine the refined focal length by:

generating a focal length adjustment factor by processing the initial three-dimensional point cloud utilizing the focal length three-dimensional point cloud neural network; and adjusting the estimated focal length based on the focal length adjustment factor to generate the refined focal length.

13. The system of claim 11, wherein the at least one server device is further configured to cause the system to determine the refined depth map by:

generating a depth adjustment factor by processing the initial three-dimensional point cloud utilizing the depth three-dimensional point cloud neural network; and determining the refined depth map by shifting depths within the depth map by the depth adjustment factor.

14. The system of claim 11, wherein the at least one server device is further configured to cause the system to:

construct an updated three-dimensional point cloud from the refined depth map and the refined focal length;

determine a further-refined focal length by processing the updated three-dimensional point cloud utilizing the focal length three-dimensional point cloud neural network; and generate the three-dimensional representation from the input digital image utilizing the further-refined focal length.

15. The system of claim 11, wherein the at least one server device is further configured to cause the system to construct the initial three-dimensional point cloud by:
- determining x and y values of a point on the initial three-dimensional point cloud by applying the estimated focal length to a corresponding point on the input digital image; and
- determining a z value of the point on the initial three-dimensional point cloud by applying a depth from a corresponding point on the depth map to the point on the initial three-dimensional point cloud.

16. The system of claim 11, wherein the at least one server device is further configured to cause the system to:
- refine one or more intrinsic camera parameters by processing the initial three-dimensional point cloud utilizing one or more additional intrinsic camera parameter three-dimensional point cloud neural networks; and
- generating the three-dimensional representation from the input digital image utilizing the refined depth map, the refined focal length, and the one or more refined intrinsic camera parameters.

17. The system of claim 11, wherein the at least one server device is further configured to cause the system to build the focal length three-dimensional point cloud neural network by:
- distorting a ground truth focal length by a ground truth focal length adjustment factor to generate a distorted focal length;
- generating a distorted three-dimensional point cloud based on the distorted focal length;
- determining a predicted focal length adjustment factor by processing the distorted three-dimensional point cloud utilizing the focal length three-dimensional point cloud neural network; and
- updating the focal length three-dimensional point cloud neural network based on comparing the predicted focal length adjustment factor and the ground truth focal length adjustment factor.

18. In a digital medium environment for editing digital images, a computer-implemented method of generating three-dimensional representations from isolated digital images, the method comprising:
- receiving a single input digital image portraying a three-dimensional scene;
- a step for determining a focal length and a depth shift corresponding to the single input digital image;
- generating a three-dimensional representation of the three-dimensional scene from the single input digital image utilizing the focal length and the depth shift; and
- providing the three-dimensional representation of the three-dimensional scene to a client device for display.

19. The method of claim 18, further comprising generating the three-dimensional representation of the three-dimensional scene from the single input digital image by unprojecting the single input digital image to the three-dimensional representation based on applying a depth map modified by the depth shift and the focal length to points of the single input digital image.

20. The method of claim 18, wherein:
- the three-dimensional representation comprises a three-dimensional point cloud of the three-dimensional scene; and
- providing the three-dimensional representation for display to the client device comprises providing the three-dimensional point cloud within a graphical user interface of the client device.

* * * * *